(12) United States Patent
Werner et al.

(10) Patent No.: US 12,413,599 B2
(45) Date of Patent: *Sep. 9, 2025

(54) SYSTEMS, METHODS, APPARATUSES AND COMPUTER PROGRAM PRODUCTS FOR EXECUTING DATA VERIFICATION OPERATIONS BETWEEN INDEPENDENT COMPUTING RESOURCES

(71) Applicant: Assurant, Inc., New York, NY (US)

(72) Inventors: Nathan Werner, New York, NY (US); Devaka Balasuriya, New York, NY (US)

(73) Assignee: Assurant, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,885

(22) Filed: Apr. 9, 2024

(65) Prior Publication Data

US 2024/0356931 A1    Oct. 24, 2024

Related U.S. Application Data

(63) Continuation of application No. 17/457,191, filed on Dec. 1, 2021, now Pat. No. 11,985,139.

(Continued)

(51) Int. Cl.
*G06F 15/16*   (2006.01)
*G06F 11/07*   (2006.01)
(Continued)

(52) U.S. Cl.
CPC ........ *H04L 63/123* (2013.01); *G06F 11/0772* (2013.01); *G06F 16/2272* (2019.01);
(Continued)

(58) Field of Classification Search
CPC ............... H04L 63/123; G06F 16/2272; G06F 16/2365; G06F 11/0772; G06F 21/6272; G06F 21/645
See application file for complete search history.

(56) References Cited

U.S. PATENT DOCUMENTS 10,795,966 B1 *  10/2020  Farner .................... H04L 67/06
11,188,390 B2    11/2021  Brebner
(Continued)

OTHER PUBLICATIONS

U.S. Appl. No. 17/457,191, filed Dec. 1, 2021, U.S. Pat. No. 11,985,139, Issued.

*Primary Examiner* — Normin Abedin
(74) *Attorney, Agent, or Firm* — Alston & Bird LLP

(57) ABSTRACT

Various embodiments are directed to apparatuses, methods, and computer program products for executing centralized data verification using supported data structures associated with one or more third-party system. In various embodiments, an apparatus is configured to retrieve from a verification system repository associated with a verification system a supported data structure associated with a data structure identifier from the verification system repository; based on the third-party system identifier associated with the data structure, provide a data structure inquiry request data packet to a third-party resource to request a verification data structure associated with the data structure identifier from the third-party resource; receive an unsupported verification data structure associated with the data structure identifier from the third-party resource in an unsupported format defined by the third-party resource; convert the unsupported verification data structure into a supported format in association with generating a supported verification data structure using one or more validation rules.

20 Claims, 8 Drawing Sheets

Related U.S. Application Data

(60) Provisional application No. 63/227,813, filed on Jul. 30, 2021.

(51) Int. Cl.

| | | |
|---|---|---|
| *G06F 16/22* | (2019.01) | |
| *G06F 16/23* | (2019.01) | |
| *G06F 21/62* | (2013.01) | |
| *G06F 21/64* | (2013.01) | |
| *H04L 9/40*  | (2022.01) | |

(52) U.S. Cl.
CPC ...... *G06F 16/2365* (2019.01); *G06F 21/6272* (2013.01); *G06F 21/645* (2013.01)

(56) References Cited

U.S. PATENT DOCUMENTS

| | | |
|---|---|---|
| 11,412,003 B1 | 8/2022 | Lyon et al. |
| 2012/0266073 A1 | 10/2012 | Tanaka et al. |
| 2014/0129526 A1* | 5/2014 | Barrat ................ G06F 16/2365 707/690 |
| 2019/0268412 A1 | 8/2019 | Kung |
| 2022/0138181 A1* | 5/2022 | Irazabal ............. G06F 16/2379 707/703 |

\* cited by examiner

SYSTEMS, METHODS, APPARATUSES AND COMPUTER PROGRAM PRODUCTS FOR EXECUTING DATA VERIFICATION OPERATIONS BETWEEN INDEPENDENT COMPUTING RESOURCES

CROSS-REFERENCE TO RELATED APPLICATIONS

This application is a continuation of nonprovisional U.S. application Ser. No. 17/457,191, filed on Dec. 1, 2021, and entitled "Systems, Methods, Apparatuses, and Computer Program Products for Executing Data Verification Operations Between Independent Computing Resources," which claims priority from provisional U.S. Application No. 63/227,813, filed on Jul. 30, 2021, and entitled "Systems, Methods, Apparatuses, and Computer Program Products for Executing Data Verification Operations Between Independent Computing Resources," each of which is incorporated herein by reference in its entirety.

FIELD OF THE INVENTION

The present disclosure relates, generally, to systems, methods, and apparatuses for executing data verification operations, and more specifically, to the operation of an independent computing system in communication with a plurality of unrelated external independent computing systems to retrieve, process, index, and validate corresponding data from uniquely credentialed external systems while reducing synchronization errors and computational inefficiency.

BACKGROUND

Various computing systems, such as those associated with a host entity, are configured to act as an intermediary party to facilitate the transfer of data between a first entity associated with a selected account data structure relating to a particular asset identifier and a second entity. Applicant has identified a number of deficiencies and problems associated with such systems. Through applied effort, ingenuity, and innovation many deficiencies of such platforms have been solved by developing solutions that are in accordance with the embodiments as discussed herein, many examples of which are described in detail herein.

BRIEF SUMMARY

In general, embodiments of the present disclosure provided herein for executing data verification operations between independent computing resources. Other implementations for executing data verification operations between independent computing resources will be, or will become, apparent to one with skill in the art upon examination of the following figures and detailed description. It is intended that all such additional implementations be included within this description be within the scope of the disclosure, and be protected by the following claims.

Various embodiments are directed to apparatuses, methods, computer program products, and systems for executing centralized data verification using supported data structures associated with one or more third-party system. In various embodiments, an apparatus for executing centralized data verification using supported data structures associated with one or more third-party system comprises one or more processors, and at least one non-transitory memory comprising instructions that, with the at least one processor, cause the apparatus to: retrieve from a verification system repository associated with a verification system a supported data structure associated with a data structure identifier from the verification system repository, the supported data structure comprising a third-party system identifier associated with a third-party system; based at least in part on the third-party system identifier associated with the supported data structure, provide a data structure inquiry request data packet to a third-party resource associated with the third-party system to request a verification data structure associated with the data structure identifier from the third-party resource; receive an unsupported verification data structure associated with the data structure identifier from the third-party resource in an unsupported format defined by the third-party resource; convert the unsupported verification data structure received from the third-party resource into a supported format in association with generating a supported verification data structure using one or more validation rules; and store the supported verification data structure associated with the data structure identifier at the verification system repository as an updated supported data structure.

In various embodiments, the one or more processors may be further configured to, upon retrieving the supported data structure associated with the data structure identifier from the verification system repository, generate the data structure inquiry request data packet, wherein the data structure inquiry request data packet comprises data structure inquiry request routing data and payload data, the data structure inquiry request routing data is generated based at least in part on the supported data structure and identifies (1) a data structure inquiry to be performed by the third-party resource associated with the third-party system and (2) a token identifying a networked system device associated with the verification system requesting the verification data structure, and the payload data comprising the data structure identifier. In various embodiments, the one or more processors may be further configured to retrieve the supported data structure associated with the data structure identifier from the verification system repository upon detecting a trigger event associated with the data structure identifier via a networked system device associated with the verification system.

In various embodiments, the one or more processors may be further configured to determine that the verification data structure associated with the data structure identifier comprises one or more data structure errors. In certain embodiments, the one or more data structure error may comprise data indicative of a missing data structure; and wherein the one or more processors are further configured to: based at least in part on a determination that the verification data structure associated with the data structure identifier comprises the one or more data structure errors comprising data indicative of indicative of the missing data structure, provide a second data structure inquiry request data packet to an additional third-party system resource associated with an additional third-party system to request a second verification data structure associated with the data structure identifier from the additional third-party resource. In certain embodiments, the one or more data structure error may comprise data indicative of an inconsistent data element; and wherein the one or more processors are further configured to: based at least in part on a determination that the verification data structure associated with the data structure identifier comprises the one or more data structure errors comprising data indicative of an inconsistent data element, append an attention-required flag to the supported data structure associated with the data structure identifier.

Further, in certain embodiments, the one or more processors may be further configured to, upon appending the attention-required flag to the supported data structure associated with the data structure identifier, automatically generate an electronic communication comprising at least a portion of the supported data structure associated with the data structure identifier to a networked system device associated with the verification system, the electronic communication being configured to present for display the at least a portion of the supported data structure and the attention-required flag appended to the supported data structure associated with the data structure identifier. In various embodiments, wherein the one or more processors may be configured to identify the inconsistent data element based at least in part on a comparison of a verification element defining at least a portion of the verification data structure with a corresponding data element of the supported data structure stored in the verification system repository and associated with the data structure identifier. In various embodiments, the one or more processors may be further configured to: based at least in part on a determination that the verification data structure associated with the data structure identifier comprises the one or more data structure errors, generate one or more error indicators associated with the data structure identifier and the third-party identifier; and store the one or more error indicators associated with the data structure identifier and the third-party identifier at the verification system repository.

In various embodiments, the one or more processors may be further configured to: provide a plurality of data structure inquiry request data packets to a plurality of third-party resources, each associated with a respective third-party system identifier; and convert a plurality of unsupported verification data structures received from each of the plurality of third-party resources into the supported format as supported verification data structures. In various embodiments, the one or more validation rules may be configured to facilitate a comparison of the verification data structure with at least a portion of the supported data structure stored in the verification system repository and associated with the data structure identifier; and wherein the one or more processors are further configured to: based at least in part on a determination that the verification data structure associated with the data structure identifier matches at least a corresponding portion of the supported data structure associated with the data structure identifier, generate a verified data structure indicator associated with the data structure identifier; store the verified data structure indicator associated with the data structure identifier at the verification system repository, such that the updated supported data structure comprises the verified data structure indicator. In certain embodiments, the one or more processors may be further configured to: associate the updated supported data structure associated with the verified data structure indicator and the data structure identifier with a second data structure identifier associated with a second third-party system, the second third-party system being associated with a second third-party organization. In certain embodiments, the one or more processors are further configured to: upon associating the second data structure identifier associated with the second third-party system with the data structure identifier, generate an electronic communication comprising the second data structure identifier and at least a portion of the updated supported data structure a secondary device associated with the second third-party system, the electronic communication being configured to present for display the second data structure identifier and the verified data structure indicator.

In various embodiments, the supported data structure may comprise a plurality of data structure elements, wherein the one or more processors are further configured to: generate a plurality of data element identifiers, each associated with a corresponding one of the plurality of data elements defining the supported data structure; and associate the data structure identifier with each of the plurality of data element identifiers, such that the supported data structure comprises each of the data element identifiers. In certain embodiments, the one or more processors are further configured to: store the supported data structure comprising each of the plurality of data element identifiers within a verification table at the verification system repository; and index the supported data structure within the verification table based at least in part on the one or more of the plurality of data elements. In certain embodiments, the one or more processors may be further configured to generate a report comprising a plurality of supported data structures, wherein each of the plurality of supported data structures included in the report is defined at least in part by a common indexed data element.

Various embodiments are directed to a method of executing centralized data verification using supported data structures associated with one or more third-party system, the method comprising: retrieving from a verification system repository associated with a verification system a supported data structure associated with a data structure identifier from the verification system repository, the supported data structure comprising a third-party system identifier associated with a third-party system; based at least in part on the third-party system identifier associated with the supported data structure, providing a data structure inquiry request data packet to a third-party resource associated with the third-party system to request a verification data structure associated with the data structure identifier from the third-party resource; receiving an unsupported verification data structure associated with the data structure identifier from the third-party resource in an unsupported format defined by the third-party resource; converting the unsupported verification data structure received from the third-party resource into a supported format in association with generating a supported verification data structure using one or more validation rules; and storing the supported verification data structure associated with the data structure identifier at the verification system repository as an updated supported data structure.

In various embodiments, the method may further comprise, upon retrieving the supported data structure associated with the data structure identifier from the verification system repository, generating the data structure inquiry request data packet, wherein the data structure inquiry request data packet comprises data structure inquiry request routing data and payload data, the data structure inquiry request routing data is generated based at least in part on the supported data structure and identifies (1) a data structure inquiry to be performed by the third-party resource associated with the third-party system and (2) a token identifying a networked system device associated with the verification system requesting the verification data structure, and the payload data comprising the data structure identifier. In various embodiments, the method may further comprise retrieving the supported data structure associated with the data structure identifier from the verification system repository upon detecting a trigger event associated with the data structure identifier via a networked system device associated with the verification system.

In various embodiments, the method may further comprise determining that the verification data structure associated with the data structure identifier comprises one or more data structure errors. In certain embodiments, the one or more data structure error may comprise data indicative of a missing data structure; and wherein the method may further comprise: based at least in part on a determination that the verification data structure associated with the data structure identifier comprises the one or more data structure errors comprising data indicative of indicative of the missing data structure, providing a second data structure inquiry request data packet to an additional third-party system resource associated with an additional third-party system to request a second verification data structure associated with the data structure identifier from the additional third-party resource.

In various embodiments, the one or more data structure error may comprise data indicative of an inconsistent data element; and wherein the method may further comprise: based at least in part on a determination that the verification data structure associated with the data structure identifier comprises the one or more data structure errors comprising data indicative of an inconsistent data element, appending an attention-required flag to the supported data structure associated with the data structure identifier. In various embodiments, the method may further comprise, upon appending the attention-required flag to the supported data structure associated with the data structure identifier, automatically generating an electronic communication comprising at least a portion of the supported data structure associated with the data structure identifier to a networked system device associated with the verification system, the electronic communication being configured to present for display the at least a portion of the supported data structure and the attention-required flag appended to the supported data structure associated with the data structure identifier. In certain embodiments, the method may further comprise identifying the inconsistent data element based at least in part on a comparison of a verification element defining at least a portion of the verification data structure with a corresponding data element of the supported data structure stored in the verification system repository and associated with the data structure identifier. In various embodiments, the method may further comprise, based at least in part on a determination that the verification data structure associated with the data structure identifier comprises the one or more data structure errors, generating one or more error indicators associated with the data structure identifier and the third-party identifier; and storing the one or more error indicators associated with the data structure identifier and the third-party identifier at the verification system repository.

In various embodiments, the method may further comprise providing a plurality of data structure inquiry request data packets to a plurality of third-party resources, each associated with a respective third-party system identifier; and converting a plurality of unsupported verification data structures received from each of the plurality of third-party resources into the supported format as supported verification data structures. In various embodiments, the one or more validation rules may be configured to facilitate a comparison of the verification data structure with at least a portion of the supported data structure stored in the verification system repository and associated with the data structure identifier; and wherein the method may comprise: based at least in part on a determination that the verification data structure associated with the data structure identifier matches at least a corresponding portion of the supported data structure associated with the data structure identifier, generating a verified data structure indicator associated with the data structure identifier; storing the verified data structure indicator associated with the data structure identifier at the verification system repository, such that the updated supported data structure comprises the verified data structure indicator.

In various embodiments, the method may further comprise associating the updated supported data structure associated with the verified data structure indicator and the data structure identifier with a second data structure identifier associated with a second third-party system, the second third-party system being associated with a second third-party organization. In various embodiments, the method may further comprise, upon associating the second data structure identifier associated with the second third-party system with the data structure identifier, generating an electronic communication comprising the second data structure identifier and at least a portion of the updated supported data structure a secondary device associated with the second third-party system, the electronic communication being configured to present for display the second data structure identifier and the verified data structure indicator. In various embodiments, the supported data structure may comprise a plurality of data structure elements, and wherein the method further comprise: generating a plurality of data element identifiers, each associated with a corresponding one of the plurality of data elements defining the supported data structure; and associating the data structure identifier with each of the plurality of data element identifiers, such that the supported data structure comprises each of the data element identifiers. In various embodiments, the method may further comprise storing the supported data structure comprising each of the plurality of data element identifiers within a verification table at the verification system repository; and indexing the supported data structure within the verification table based at least in part on the one or more of the plurality of data elements. In certain embodiments, the method may further comprise generating a report comprising a plurality of supported data structures, wherein each of the plurality of supported data structures included in the report is defined at least in part by a common indexed data element.

Various embodiments are directed to a computer program product for executing centralized data verification using supported data structures associated with one or more third-party system, the computer program product comprising a non-transitory computer-readable storage medium storing computer program code that, when executed by an apparatus, causes the apparatus to: retrieve from a verification system repository associated with a verification system a supported data structure associated with a data structure identifier from the verification system repository, the supported data structure comprising a third-party system identifier associated with a third-party system; based at least in part on the third-party system identifier associated with the supported data structure, provide a data structure inquiry request data packet to a third-party resource associated with the third-party system to request a verification data structure associated with the data structure identifier from the third-party resource; receive an unsupported verification data structure associated with the data structure identifier from the third-party resource in an unsupported format defined by the third-party resource; convert the unsupported verification data structure received from the third-party resource into a supported format in association with generating a supported verification data structure using one or more validation rules; and store the supported verification data structure associated with the data structure identifier at the verification system repository as an updated supported data structure.

In various embodiments, the computer program code, when executed by the apparatus, may further cause the apparatus to, upon retrieving the supported data structure associated with the data structure identifier from the verification system repository, generate the data structure inquiry request data packet, wherein the data structure inquiry request data packet comprises data structure inquiry request routing data and payload data, the data structure inquiry request routing data is generated based at least in part on the supported data structure and identifies (1) a data structure inquiry to be performed by the third-party resource associated with the third-party system and (2) a token identifying a networked system device associated with the verification system requesting the verification data structure, and the payload data comprising the data structure identifier. In various embodiments, the computer program code, when executed by the apparatus, may further cause the apparatus to retrieve the supported data structure associated with the data structure identifier from the verification system repository upon detecting a trigger event associated with the data structure identifier via a networked system device associated with the verification system. In certain embodiments, the computer program code, when executed by the apparatus, may further cause the apparatus to determine that the verification data structure associated with the data structure identifier comprises one or more data structure errors.

In various embodiments, the one or more data structure error may comprise data indicative of a missing data structure; and wherein the computer program code, when executed by the apparatus, further causes the apparatus to: based at least in part on a determination that the verification data structure associated with the data structure identifier comprises the one or more data structure errors comprising data indicative of indicative of the missing data structure, provide a second data structure inquiry request data packet to an additional third-party system resource associated with an additional third-party system to request a second verification data structure associated with the data structure identifier from the additional third-party resource. In various embodiments, the one or more data structure error may comprise data indicative of an inconsistent data element; and wherein the computer program code, when executed by the apparatus, further causes the apparatus to: based at least in part on a determination that the verification data structure associated with the data structure identifier comprises the one or more data structure errors comprising data indicative of an inconsistent data element, append an attention-required flag to the supported data structure associated with the data structure identifier.

In various embodiments, the computer program code, when executed by the apparatus, may further cause the apparatus to, upon appending the attention-required flag to the supported data structure associated with the data structure identifier, automatically generate an electronic communication comprising at least a portion of the supported data structure associated with the data structure identifier to a networked system device associated with the verification system, the electronic communication being configured to present for display the at least a portion of the supported data structure and attention-required flag appended to the supported data structure associated with the data structure identifier. In various embodiments, the computer program code, when executed by the apparatus, may further cause the apparatus to identify the inconsistent data element based at least in part on a comparison of a verification element defining at least a portion of the verification data structure with a corresponding data element of the supported data structure stored in the verification system repository and associated with the data structure identifier.

In various embodiments, the computer program code, when executed by the apparatus, may further cause the apparatus to based at least in part on a determination that the verification data structure associated with the data structure identifier comprises the one or more data structure errors, generate one or more error indicators associated with the data structure identifier and the third-party identifier; and store the one or more error indicators associated with the data structure identifier and the third-party identifier at the verification system repository. In various embodiments, the computer program code, when executed by the apparatus, may further cause the apparatus to provide a plurality of data structure inquiry request data packets to a plurality of third-party resources, each associated with a respective third-party system identifier; and convert a plurality of unsupported verification data structures received from each of the plurality of third-party resources into the supported format as supported verification data structures.

In various embodiments, the one or more validation rules are configured to facilitate a comparison of the verification data structure with at least a portion of the supported data structure stored in the verification system repository and associated with the data structure identifier; and wherein the computer program code, when executed by the apparatus, further causes the apparatus to: based at least in part on a determination that the verification data structure associated with the data structure identifier matches at least a corresponding portion of the supported data structure associated with the data structure identifier, generate a verified data structure indicator associated with the data structure identifier; store the verified data structure indicator associated with the data structure identifier at the verification system repository, such that the updated supported data structure comprises the verified data structure indicator. In various embodiments, the computer program code, when executed by the apparatus, may further cause the apparatus to associate the updated supported data structure associated with the verified data structure indicator and the data structure identifier with a second data structure identifier associated with a second third-party system, the second third-party system being associated with a second third-party organization. In various embodiments, the computer program code, when executed by the apparatus, may further cause the apparatus to, upon associating the second data structure identifier associated with the second third-party system with the data structure identifier, generate an electronic communication comprising the second data structure identifier and at least a portion of the updated supported data structure a secondary device associated with the second third-party system, the electronic communication being configured to present for display the second data structure identifier and the verified data structure indicator.

In various embodiments, the supported data structure may comprise a plurality of data structure elements, wherein the computer program code, when executed by the apparatus, further causes the apparatus to generate a plurality of data element identifiers, each associated with a corresponding one of the plurality of data elements defining the supported data structure; and associate the data structure identifier with each of the plurality of data element identifiers, such that the supported data structure comprises each of the data element identifiers. In various embodiments, the computer program code, when executed by the apparatus, may further cause the apparatus to store the supported data structure comprising each of the plurality of data element identifiers within a verification table at the verification system repository; and index the supported data structure within the verification table based at least in part on the one or more of the plurality of data elements. In various embodiments, the computer program code, when executed by the apparatus, may further cause the apparatus to generate a report comprising a plurality of supported data structures, wherein each of the plurality of supported data structures included in the report is defined at least in part by a common indexed data element.

BRIEF DESCRIPTION OF THE DRAWINGS

Reference will now be made to the accompanying drawings, which are not necessarily drawn to scale, and wherein.

DETAILED DESCRIPTION

Figure 1:
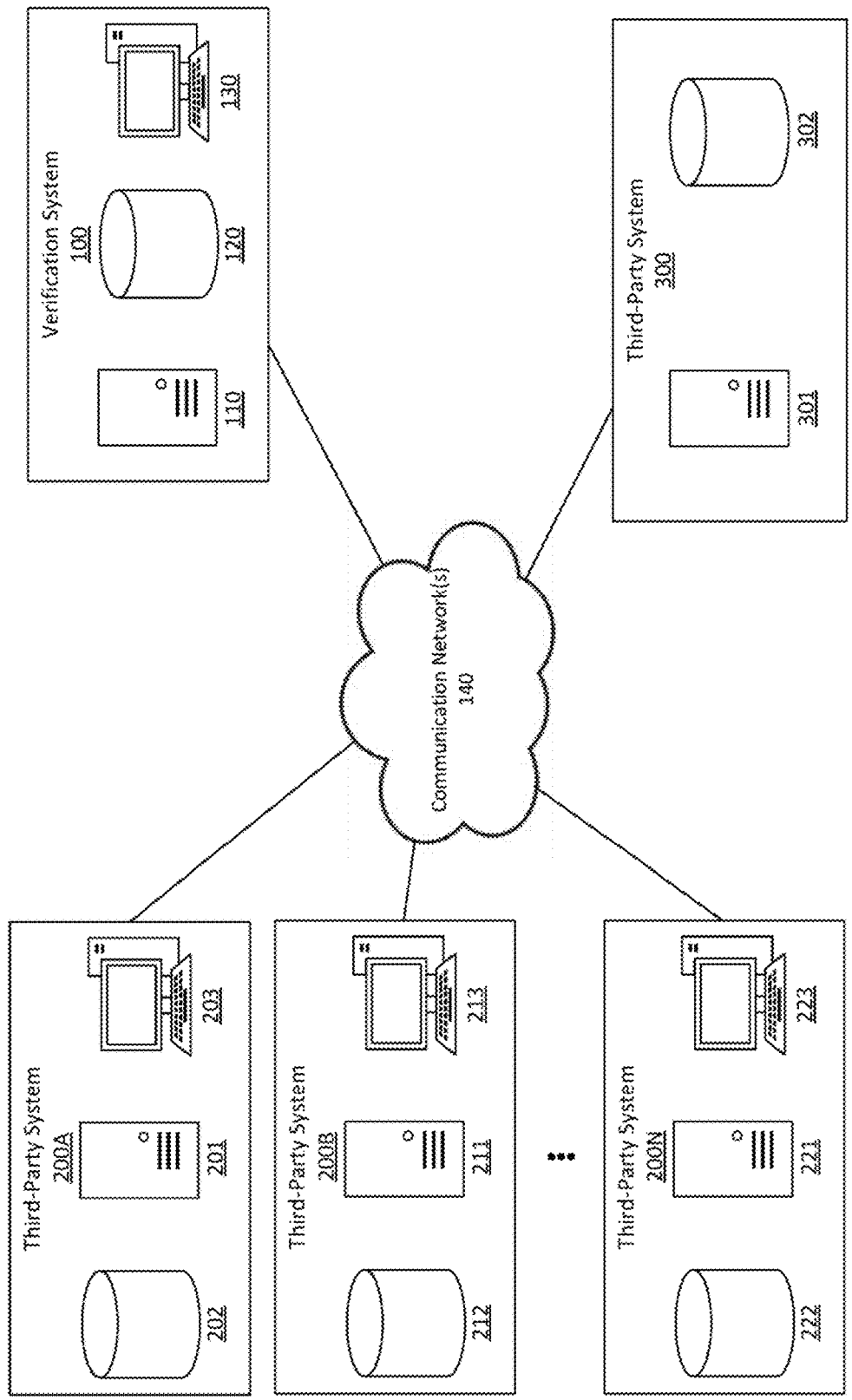
FIG. 1 illustrates a schematic block diagram of a centralized data verification system that may be specifically configured, within which embodiments of the present disclosure may operate.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Embodiments of the present disclosure now will be described more fully hereinafter with reference to the accompanying drawings, in which some, but not all embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Various transactions relating to aspects of homeownership often require a variety of information to be transferred between various parties of interest. For example, home owners regularly interact with insurance providers for purposes of purchasing an insurance policy covering one or more aspects of the property and/or performing any number of other transactions. As a further example, home owners regularly interact with lender entities, such as, for example, banks, mortgage companies, and/or the like, for purposes of obtaining a financial loan for an amount corresponding to some portion of the cost of a property and/or performing any number of other transactions. In such circumstances, such lender entities may be legally obligated to maintain an updated and accurate record of insurance information relating to a property for which they have provided a financial loan to a home owner. In certain circumstances, entities such as insurance providers or lender entities may lack robust information technology infrastructure, causing information systems operated by such companies to lack complete information associated with property or loan details, and further, to lack the ability to effectively process information associated with the property such as customer/purchaser information, property information, insurance policy information, loan information, and/or the like. Even where information technology infrastructures are adequate, factors such as market fragmentation and inconsistent protocols and onboarding procedures may make large scale, multi-provider systems difficult to implement or otherwise impractical. Further, the everchanging regulatory landscape often produces rapid changes to the rules that a lender entity must abide by with respect to content, quantity, and/or accuracy of the insurance-related data maintained in its records.

Many third-party systems who purport to track loan related information may maintain out-of-date information associated with a particular customer or a particular property. Such systems might also lack important information outright or might lack the means to quickly and efficiently acquire such information, particularly when the requisite information is not generated by the system itself, or otherwise relates to information that is outside of the scope of the third-party's traditional functionality. These problems may be exacerbated by the large number of provider entities and lender entities present in the industry, and more specifically, the varying scope of operations and resources exhibited throughout the industry leading to a vast number of fragmented protocols defined by inconsistent data processing platforms.

The present disclosure relates generally to systems, methods, and apparatuses for executing centralized data verification using supported data structures associated with one or more third-party resources. Various embodiments described herein are directed to centralized data verification systems configured for receiving a verification data structure associated with a data structure identifier from a third-party resource in an unsupported format and converting the unsupported verification data structure received from the third-party resource into a supported format in association with generating a supported verification data structure using one or more validation rules. A centralized data verification system stores the supported verification data structure associated with the data structure identifier at the system repository as an updated supported data structure so as to facilitate a consistent and at least substantially platform-agnostic data verification operation.

Centralized data verification systems as described herein are particularly preferred when compared to computing systems that rely on a manual, user-driven credentialing process to retrieve various third-party data from a third-party resource associated with a third-party entity (e.g., a provider entity), whereby a user associated with the computing system (e.g., associated with a lender entity) manually provides credentials associated with the computing system to a front-end interface corresponding to a third-party system in order to obtain access to the desired third-party data. Various centralized data verification systems described herein facilitate the production of real-time, on-demand data structures (e.g., property data, provider data, lender data, and/or the like) in a substantially quick, intuitive, efficient, and seamless manner. Such centralized data verification systems are particularly preferred when compared to computing systems defined by infrastructure deficiencies that render the computing system unable to rapidly interface with a third-party system for the retrieval of third-party data and, instead, cause the computing system to rely on front-end, user-driven methods of retrieving third-party data from a third-party resource. Further, such centralized data verification systems are particularly preferred when compared to computing systems defined by infrastructure deficiencies that require creation, transmission, and/or storage of unique documents to retrieve third-party data.

The present invention further relates to providing a centralized solution for data collection, storage, and dissemination to various applications and systems dealing in various matters relating to the ownership of a home, such as, for example, systems operated by entities responsible for the payment, protection, maintenance, ownership, and/or the like, of a property which utilize various information to facilitate related operations. For example, the present invention provides systems and methods for facilitating near-real time and/or on-demand transmission of third-party data associated with a data structure identifier (e.g., relating to a particular property) between separate noncommunicative third-party systems operated respectively by separate third-party entities (e.g., a lender entity and a provider entity). Further, the present invention provides systems and methods for facilitating verification of third-party data stored at a third-party resource (e.g., a lender entity system) and associated with a data structure identifier that is in turn associated with the third-party resource (e.g., third-party data relating to an insurance policy covering a property associated with a loan financed by the lender entity) via one or more data storage and indexing processes utilized by the centralized data verification system to convert various unsupported verification data structures received from various third-party resources into a supported format (e.g., so as to cause disjointed third-party data defined by various incompatible protocols to be rendered operable for processing and/or use by the centralized data verification system).

Difficulties faced by the inventors in attempting to solve the problem of slow, inefficient, inconsistent, or non-existent communication of incongruent data from a third-party system required identifying and solving a number of problems, examples of which are discussed herein. For example, data verification systems may experience inefficiencies and/or failures in processing various third-party data received from a plurality of unique third-party systems, each providing third-party data structured in a distinct unsupported format defined by the corresponding third-party resource (e.g., the third-party systems operating on a unique platform that stores and transmits data in a unique format that is at least partially incompatible with the unsupported data (e.g., uniquely formatted data) received from other third-party resources).

Centralized data verification systems described herein facilitate retrieval of third-party data from various third-party systems and/or verification of supported data structures comprising error-free data structures associated with third-party identifiers (e.g., complete lender data, provider data, and/or property data) by utilizing back-end-driven communication means that facilitate at least substantially consistent communications between the centralized data verification system and the various third-party resources (e.g., between the centralized data verification system and the lender entities, and/or between centralized data verification system and the provider entities). For example, data verification systems as described herein are configured to facilitate maintenance of accurate and updated insurance information relating to a property on behalf of a lender entity that may be subject to a legal obligation to keep accurate records for such information. Further, data verification systems as described herein are structured to facilitate a flexible data verification operation, wherein the data verification systems may rapidly adjust the type of data elements collected, the format of the data structures stored, and otherwise programmatically adapt to a detected change in situational context and/or regulatory requirements.

Various embodiments of the present invention execute the above described functionalities by using back-end-driven communication means that enable the centralized data verification system to execute on-demand data transmissions directly with a third-party resource via deliberate communication operations that are triggered, identified, stored, logged, maintained, audited, authenticated, and/or the like, as evidence of legal and/or regulatory compliance. For example, centralized data verification systems described herein may be configured to dynamically modify one or more system instructions to the verification system so as to update the type and/or scope of the policy data that is requested from a third-party system by the verification system via the back-end-driven communication means, or the frequency with which such communications are executed by the verification system (e.g., via verification workflows).

The centralized data verification system may flexibly incorporate one or more updated validation rules such that unsupported verification data structures retrieved from a third-party system by the verification system in response to an updated legal and/or regulatory requirement may be converted to a supported format and stored as part of a supported data structure in order to facilitate compliance with the updated legal and/or regulatory requirements. Further, centralized data verification systems, as described herein, enable consolidated legal compliance efforts by being configured to execute verification workflows through secure data transmissions between the centralized data verification system and a third-party resource that result in identifiable and auditable supported data structures being stored at the verification system such that they may be retrieved by the verification system for purposes of providing evidence of authentication so as to satisfy ever-changing legal and/or regulatory requirements applied to the verification system or a third-party system in communication therewith.

Such centralized data verification systems are particularly preferred when compared to computing systems having infrastructure deficiencies that render them unable to flexibly modify a contextual or operational parameter of the communications occurring between the computing system and a third-party system to rapidly and programmatically accommodate changing legal and/or regulatory requirements. Such computing systems instead accommodate only piecemeal modification to communication operations in a manner that is ad-hoc, manual, and user-driven. Such ad-hoc, manual, and user-driven modifications are neither computationally efficient nor suited to producing an auditable and verifiable log of communication operations executed by the computing system when retrieving third-party data from a third-party resource.

Some embodiments further facilitate a noninvasive, on-demand transfer of data between the centralized verification system and each of a plurality of third-party systems, such as, for example, lender systems, provider systems, and/or the like. For example, various embodiments are directed to converting unsupported verification data received from a third-party resource associated with a third-party entity into a supported format using one or more validation rules, so as to facilitate a consistent and at least substantially platform-agnostic data verification operation. For example, an exemplary verification system may generate data structures defined by a supported format that comprises provider data (e.g., Carrier XYZ), lender data (e.g., Lender ABC and loan number 9999), and borrower data (e.g., borrower name Richard Rich), which are each associated with a common property identifier (e.g., parcel number 0001-000-01-0000).

Various embodiments of the present invention execute the above described functionalities by storing supported data structures comprising a plurality of generated data element identifiers corresponding, respectively, to the plurality of data characteristics associated with one or more properties, an insurance policy, and/or one of the related entities, a verification table at the system repository; and further indexing each of the various data structures within the verification table based at least in part on the one or more of the plurality of data elements. As described herein, indexing each supported data structure at a centralized storage location accessible to the verification system facilitates a broader, more robust, low-latency data verification operation within the verification system, specifically enabling a more efficient identification of congruent data and/or any other data that might comprise one or more errors. Such embodiments further include identifying one or more data structure errors (e.g., data indicative of a missing data structure and/or an inconsistent data element) within a verification data structure received from a third-party resource (e.g., a provider entity) via an at least substantially automated process. In various embodiments, a centralized data verification system described herein identifies one or more data structure errors in a supported data structure associated with data structure identifier (e.g., a property identifier), and, in response, generates an automated communication to one or more devices associated with a user having appropriate credentials to access the verification system and further troubleshoot the detected error (e.g., a user associated with a device associated with the centralized data verification system).

Definitions

In some embodiments, some of the operations above may be modified or further amplified. Furthermore, in some embodiments, additional optional operations may be included. Modifications, amplifications, or additions to the operations above may be performed in any order and in any combination.

The terms "verification system" or "centralized data verification system" are used interchangeably to refer to a hardware and software platform for executing centralized data verification using supported data structures associated with one or more third-party system. The verification system comprises an apparatus comprising at least one processor, and at least one non-transitory memory comprising instructions that, with the at least one processor, cause the apparatus to execute one or more verification operations defining a verification workflow associated with a data structure identifier. In some examples, the verification system may take the form of one or more central verification servers disposed in communication with one or more additional servers running software applications, and having access to one or more databases storing digital content items, application-related data, and/or the like. In certain embodiments, the verification system is defined by a collection of computing devices including a verification server, a verification system repository, and one or more networked devices.

A verification system is operated by and/or otherwise controlled by a host entity, such as, for example, a verification entity for purposes of supporting one or more actions performed by the verification entity. In some embodiments, for example, the verification system is embodied by one or more computing devices configured to execute one or more verification operations so as to define a verification workflow by facilitating various data processes configured to result in a confirmation of the existence of and/or specific details relating to an insurance policy provided by a third-party insurance provider). In certain embodiments, a verification system provides a data structure inquiry request data packet to a third-party system resource associated with the third-party system to request a verification data structure associated with the data structure identifier from the third-party resource. Further, a verification system generates a supported verification data structure by executing one or more instructions to process unsupported verification data received from a third-party resource using one or more validation rules in order to convert the unsupported verification data structure into a supported format.

The term "verification server" refers to one or more computing devices associated with a centralized data verification system and configured to receive, store, and otherwise process data in order to execute verification workflows by interacting with various networked devices and/or third-party systems. In various embodiments, a verification server is configured to receive, generate, transmit, store, and/or otherwise process data including data structures, data elements, data packets, and/or the like to be communicated between the verification system and one or more third-party systems. For example, a verification server is configured to execute various instructions, actions, and/or the like so as to enable the verification system to execute at least a portion of a verification operation. In certain embodiments, the functionality of the verification server is provided via a single server, or, alternatively, via a collection of servers having a common functionality, or, in further alternative embodiments, the functionality of the verification servers is segmented among a plurality of servers or collections of servers performing subsets of the described functionality of the verification server. For example, a verification server is configured to facilitate secure communication of identifiable data between the centralized data verification system and a third-party resource associated with a third-party system by, as non-limiting examples, utilizing a verification token to identify and/or authenticate the identity of a third-party system, third-party resource, and/or device associated therewith, maintaining blockchain implementations that store data associated with various electronic communication operations that define a verification workflow, and/or the like.

As a non-limiting example, in certain embodiments, a first subset of verification servers is configured for retrieving and/or receiving a verification data structure associated with a data structure identifier from a third-party system (e.g., a third-party resource) in an unsupported format. That verification server is in communication with a second subset of verification servers configured for converting the unsupported verification data structure received from the third-party resource into a supported format as a supported verification data structure by executing one or more validation rules. These verification servers are in communication with a third subset of verification servers configured for storing the supported verification data structure associated with the data structure identifier at a verification system repository of the verification system for indexing and archiving as an updated supported data structure. These verification servers are in communication with a fourth subset of verification servers configured for transmitting at least a portion of the updated supported data structure to a third-party system and/or a device associated therewith based at least in part on an identifier defining at least a portion of that updated supported data structure (e.g., a third-party identifier, such as for example, a lender identifier).

"Data" in this context refers to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a verification system, third-party system, computing device associated therewith, and/or the like is described herein to send data to another verification system, third-party system, computing device associated therewith, and/or the like, it will be appreciated that the data may be sent either directly to the other system, computing device, and/or the like or may be sent indirectly via one or more intermediary computing devices, such as, for example, one or more servers, resources, relays, routers, network access points, base stations, hosts, and/or the like. As a non-exhaustive list provided for illustrative purposes, provider data, policy data, lender data, system data, and/or the like embody data as described herein.

The term "data packet" as utilized herein refers to a collection of data including data structures and/or individual data elements that is transmittable between a plurality of computing entities (e.g., devices, servers, systems, and/or the like) collectively, such that the included data (e.g., data structures, data elements) remains associated therewith. The data packet is configured to store data therein with a standardized formatting, such that computing entities are able to automatically determine the type of data stored within the data packet. For example, a data packet comprise substantive data stored within a payload of the data packet that is to be passed between computing entities, as well as metadata associated with the generation of the data packet that is stored within a routing data portion of the data packet. For example, a data packet may be a data structure inquiry request data packet comprising data structure inquiry request routing data and payload data including a data structure identifier, the data structure inquiry request data packet being generated by a centralized data verification system and provided to a third-party resource associated with a third-party system in order to enable the third-party system to retrieve verification data based at least in part on the payload data (e.g., data associated with a data structure identifier that is stored at a third-party resource) so as to facilitate an execution of a verification operation by the verification system. For example, a data packet may be a verification confirmation data packet comprising verification confirmation routing data and payload data, including a verified data structure indicator associated with an updated supported data structure, the verification confirmation data packet being generated by a centralized data verification system and provided to a second third-party system (e.g., a third-party system that is associated with the data structure identifier associated with the updated supported data structure and distinct from the first third-party system that provided the verification data structure to the verification system).

The term "timestamp" refers to a digital representation of network time associated with an action relating to a data structure, such as, for example, the receipt, transmission, and/or updating of the data structure by a verification system. The timestamp may be analyzed by the verification system to determine context regarding the data structure (e.g., the exact moment at which the data structure was transmitted, received, and/or updated by the verification system).

"Verification interface" in this context refers to a specifically structured interactive virtual environment that is configured for selective presentation of various data structures, as described herein. A verification interface comprises a user interface comprising data rendered to a display of a computing device that includes one or more interface elements visible to a user of the computing device. In some embodiments, a verification interface is interactable such that the use may perform various user interaction(s) with the one or more of the structured interface elements defined within the interface, each of which may correspond to a unique functionality of the verification interface. In particular, it should be appreciated that in various example contexts, a verification interface provides access to particular functionality of a centralized data verification system via one or more computing devices (e.g., initiation of one or more processes, communication with a remote processing server configured to perform particular functionality, and/or updating of renderings to a display). In certain embodiments, a verification interface is configured to render a data element, a data structure, and/or the like, such as, for example, a data element defining at least a portion of an unsupported verification data structure, a supported data structure, a supported verification data structure, an updated supported data structure, so as to facilitate user interaction with the rendered data within the verification system.

The term "verification system repository" refers to a database or computing location associated with a centralized data verification system where data is stored, accessed, modified and otherwise maintained by the verification system. The verification system repository may be used by the verification system to store data, including supported data structures, in order to facilitate at least one operation of the verification system, such as, for example, a verification operation. The verification system repository facilitates storage of various data, including data structures, in a supported format defined by a data storage protocol that is native to the verification system. In certain embodiments, the verification system repository embodies a data storage device or devices, a separate database server or servers, or as a combination of data storage devices and separate database servers. Further, in some embodiments, the verification system repository may be embodied as a distributed repository such that some of the stored data is stored centrally in a location within the verification system and other data stored in a single remote location or a plurality of remote locations. Alternatively, in some embodiments, the verification system repository may be distributed over a plurality of remote storage locations only such as in a cloud storage environment.

"User" in this context refers to an individual, a group of individuals, a business, an organization, and/or the like that access a centralized data verification system using one or more networked devices. In certain embodiments, a user is associated with a system organization embodied by an organization that operates the verification system. Alternatively, in certain embodiments, a user is associated with a third-party system operated by a third-party entity, such that a device associated with a user identifier associated with the user defines at least a portion of the third-party system. The relationship of the organization with which the user is associated to the verification system is defined by access credentials that are common, at least in part, to all users associated with that organization.

The terms "user profile," "user account," and "user account details" refer to information associated with a user that is stored and tracked by the centralized verification system, including, for example, a user identifier, a third-party identifier associated with a third-party system with which the user is associated and/or with which the user is authorized to communicate supported data structures, various indicators representative of whether the user is associated with one or more unverified data structures, an email address, a real name (e.g., Jane Smith), a username (e.g., janesmith01), a password, a user surname, a time zone, metadata indicating historical data associated with policy information and/or one or more verification operations executed by the verification system, and/or the like.

The term "third-party system" refers to one or more computing devices embodied in hardware, software, firmware, and/or a combination thereof, operated by and/or otherwise controlled by a third-party entity (e.g., a business or an organization) or an agent thereof for purposes of supporting one or more actions performed by the third-party entity. For example, a third-party system may include a software program, application, platform, or service that is configured to communicate with a centralized data verification system for purposes of servicing, managing, and/or performing one or more actions that define various functions and/or operations of a third-party business organization that is accessible to a networked device and/or the verification system. For example, as described herein, a third-party system is a system operated by a third-party entity such as an insurance provider (i.e. a "provider") or a lender entity (i.e. a "lender"). By way of further example, in some embodiments, a third party system may a system operated by an additional third-party entity that is in communication with a third-party resource 201 and/or a third-party resource 301 and that has been authorized by the third-party resource 201 and/or the third-party resource 301 to facilitate the communication of policy data and/or property data associated therewith. As a non-limiting example, such a third party system may comprise an external provider of API access for one or more provider entities and/or lender entities (e.g., LenderDock™ by CSA Solutions, Inc.).

In some embodiments, the third-party system is embodied by one or more computing devices configured to perform functionality associated with a verification workflow. In certain circumstances, a third-party system operates on a compiled code base or repository that is separate and distinct from that which supports the verification system. In certain embodiments, the third-party system comprises additional storage repositories (e.g., databases) associated with tasks, functions, and/or actions that may be performed via the third-party system, such as, for example, tasks, functions, and/or actions that may be performed in order to facilitate one or more functions or operations of the verification system. In some embodiments, the third-party system communicates with the verification system, and vice versa, through one or more application program interfaces (APIs). In some embodiments, the third-party system is configured to receive one or more tokens or other authentication credentials that are used to facilitate secure communication of identifiable data between the third-party system and the verification system in view of verification system network security layers or protocols (e.g., network firewall protocols).

The term "device" or "networked device" refers to computer hardware and/or software that is configured to access one or more services made available by a server. For example, in certain embodiments, the device is defined by computer hardware and/or software configured to access a service made available by a verification server of the centralized data verification system and/or is in communication with one or more networked devices of the verification system. In various circumstances, a device is associated with a third-party system that is in communication with the verification system, such that the device has access to various functionalities of the verification system by way of a network. Devices may include, without limitation, smart phones, tablet computers, laptop computers, wearables, personal computers, enterprise computers, and/or the like.

"Verification token" in this context refers to an identifier, code, or key that uniquely identifies a particular device, such as, for example, a networked device. A verification token may also refer to one or more sets of credentials associated with a data structure identifier and/or a third-party identifier associated with a third-party system. The centralized data verification system utilizes a verification token to identify and/or authenticate the identity of a third-party system, third-party resource, and/or device associated therewith in order to facilitate authenticated transmission of various data from and/or received by the verification system through one or more data packets. In certain embodiments, a verification token is static such that a device is permanently associated with the particular token until an affirmative action is taken to change the associated token. Alternatively, in other embodiments, a verification token is dynamic such that the token is assigned to a particular device for a short duration, such as a period of time associated with performing a particular task, a period of time associated with a unique connection session between the device and a verification system, and/or the like. Moreover, in certain embodiments, verification tokens comprise encrypted data that utilizes at least one of a variety of encryption methodologies for added security against unauthorized usage of the token.

The term "data structure" refers to a collection of data capable of being collectively transmitted, received, and/or stored. For example, a supported data structure is a collection of data elements stored and/or used by a centralized data verification system that is defined by a supported data format and associated with a common data structure identifier. A supported data structure is defined by a plurality of data elements. In various embodiments, each of the plurality of data elements defining a supported data structure is associated with a common data structure identifier. For example, in various embodiments, a supported data structure comprises a collection of data within a centralized data verification system relating to the same property or the same insurance policy. In various embodiments, a supported data structure can include converted unsupported data that was converted from an unsupported format to a supported format by the verification server. In various embodiments, supported data structures comprise data elements that include property data, policy data, lender data, and/or system data associated with a common data structure identifier, such as, for example, a common policy identifier and/or a common property identifier. In certain embodiments, supported data structures may be defined by a plurality of data elements stored within the verification system repository of the centralized data verification system, including a policy identifier, a third-party identifier (e.g., a provider identifier) associated with the policy identifier, an insured party name (e.g., surname), an insured property street address, an insured property zip code, a policy identifier, and/or the like.

A supported data structure is stored within the verification system repository in a supported format, such that the verification system is configured to operate with various data structures received from a plurality of different third-party systems—each of which may operate using a respective unsupported format—using a singular format supported by the centralized data verification system. For example, a supported format utilizes stored data storage protocols native to the verification system under an architecture that is operatively managed by the verification system. By contrast, an unsupported format is a data storage format that does not embody such a supported format.

In various embodiments, a supported data structure is selectively associated with at least a portion of a verification data structure received from a third-party resource by a verification system (e.g., a verification server) in a verification workflow. The verification system selectively associates at least a portion of a verification data structure received from the third-party system with a supported data structure associated with a common data structure identifier, so as to define an updated supported data structure configured for storage at the verification system repository of the verification system.

The term "data structure inquiry request" refers to a collection of data associated with a data structure, and/or the like that is capable of being transmitted by a verification server of a centralized data verification system to a third-party system (e.g., a device associated therewith) and provides instructions requesting that the third-party system (e.g., third-party resource, a device associated with a third-party identifier, and/or the like) transmit at least a portion of a data structure (e.g., a data element) associated with the third-party system to the verification server. In certain embodiments, the verification server transmits a data structure inquiry request associated with a data structure identifier that identifies a particular property to a third-party system as a means of retrieving data associated with the particular property that is stored at the third-party system and which is not directly accessible to the verification system. The retrieved data is indexed and/or stored in association with one or more data structures stored at a system repository of the verification system so as to collectively define an updated supported data structure. For example, in certain embodiments, upon receiving a data structure inquiry request from a verification server, the third-party system transmits an unsupported verification data structure associated with the data structure inquiry request to the verification structure, including various third-party data corresponding to the data structure identifier identifying the particular property and/or particular insurance policy that was associated with the data structure inquiry request. In various embodiments, a data structure inquiry request transmitted to a third-party resource comprises a data structure inquiry request data packet associated a data structure identifier (e.g., a policy identifier) and a third-party identifier associated with the third-party resource. In various embodiments, the data structure inquiry request is embodied as a verification data structure confirmation request.

The term "verification workflow" refers to a collection of data and instructions that represent the selective verification of at least a portion of a supported data structure stored at a verification system repository based at least in part on a data structure retrieved and/or otherwise received from a third-party system by a verification system. In various embodiments, each verification workflow is associated with a verification workflow identifier that uniquely identifies a particular verification workflow and may be stored at the system repository. As an illustrative example, a verification workflow may include the one or more operations that define the process of the verification system verifying policy data associated with a particular property. For example, a supported data structure stored by the verification system may include data relating to a first property with an address at 123 Peachtree Street, Atlanta, GA 30318, a property owner named Richard Rich, a five-million dollar property value, and an insurance policy provided by Insurance Provider A, identified by policy number of 9012345. In an exemplary embodiment, the verification system may execute a verification workflow to confirm the accuracy of stored policy data associated with the above-referenced first property and/or obtain all available missing policy data relating to the first property's insurance policy, such as, for example, the policy expiration data and the policy annual premium associated with policy number 9012345. An exemplary verification workflow may comprise a series of verification system operations including a back-end-driven electronic communication (e.g., executed using verification tokens, blockchain implementations, and/or the like) between the verification server and a third-party resource associated with a third-party system operated by a third-party entity, such as, for example, Insurance Provider A to retrieve policy data associated with an identifier (e.g., a property address of the first property) that is stored in an unsupported format by the third-party system operated by the third-party entity (e.g., at a server, repository, and/or the like associated with Insurance Provider A). For example, the above-referenced policy data communicated between the third-party resource and the verification server which may include policy data describing a policy number of 9012345, an Oct. 1, 2021 policy expiration date, and a $2200.00 policy annual premium. An exemplary verification workflow may further include converting the policy data retrieved in an unsupported format from the third-party resource associated with the third-party system operated by Insurance Provider A to a supported format using one or more validation rules, and storing the data associated with the identifier (e.g., the property address of the first property) in the supported format at the verification system (e.g., at a system repository associated with the verification system). Upon execution of the above-described example verification workflow, as described herein, the verification server stores a supported data structure associated with the identifier (e.g., the property address of the first property)—defined by data corresponding to the unsupported policy data associated with the identifier that the verification server retrieved from the third-party resource and converted to the supported format using the one or more validation rules—at the verification system (e.g., at a system repository) such that the supported data structure associated with the identifier includes data relating to policy data associated with the identifier (e.g., an insurance policy providing coverage for a property associated with the property address) that has been confirmed to be provided by the third-party system operated by the third-party entity (e.g., Insurance Provider A), with a verified policy number of 9012345, and updated data elements representative of the Oct. 1, 2021 policy expiration date and the $2200.00 policy annual premium. For example, the above-described example workflow may be uniquely identified by the verification system using a verification workflow identifier, such as "First Property Verification_1," "9012345_8_24," a time-stamp corresponding to the instance at which the verification workflow was completed, or any other that may be used to uniquely identify the example verification workflow.

In various embodiments, a verification workflow associated with a particular data structure identifier includes an ordered combination of actions, including verification operations, executed and/or initiated at least in part by a centralized data verification system through which the verification system modifies, updates, verifies, and/or otherwise confirms the accuracy of a supported data structure associated with the particular data structure identifier. In certain embodiments, a verification workflow comprises one or more verification operations executed by a verification server. For example, in certain embodiments, a verification workflow comprises a verification server of the verification system transmitting a data structure inquiry request to a third-party system, thereafter receiving an unsupported verification data structure from a third-party resource of the third-party system and/or a device associated therewith in an unsupported format dependent on the hardware and software platform defining the third-party resource, converting the unsupported verification data structure received from the third-party resource into the supported format as a supported verification data structure using one or more validation rules, and store the supported verification data structure associated with the data structure identifier at the system repository as an updated supported data structure.

As a non-limiting example, in certain embodiments, a verification workflow associated with a selected property of interest associated with a lender, such as, for example, Lender A, includes the centralized data verification system receiving a verification data structure from a third-party system associated with Carrier XYZ in. The verification system processes the verification data structure received from the third-party system associated with Carrier XYZ, and determines based at least in part on the received verification data structure that the policy data associated with the property of interest contains one or more data structure errors (e.g., omissions, inconsistencies, data gaps, and/or the like). In response, the verification system designates a supported data structure that is and associated with the selected property of interest and/or the policy associated therewith as requiring further manual attention and/or action in order to facilitate the corresponding verification operation.

The term "third-party identifier" refers to one or more items of data by which a third-party business or organization may be uniquely identified. For example, a third-party identifier may comprise ASCII text, a pointer, a memory address, and the like.

The term "third-party system data" refers to data associated with a third-party system operated by a third-party entity that is capable of being transmitted, received, and/or stored. Third-party system data comprises data corresponding to the organizational function, as defined relative to the verification system, of a third-party entity that operates the third-party system associated with the third-party system data. In various embodiments, third-party system data is stored by the third-party system associated therewith in either a supported data format or an unsupported data format. For example, in certain embodiments, third-party system data is stored at a third-party resource in an unsupported format that is dependent, at least in part, on the hardware and software platform defining the third-party resource.

Further, in an exemplary circumstance wherein a third-party system is operated by a third-party entity that is a provider entity, the third-party system data comprises provider data, policy data, property data, and/or the like, as described herein, corresponding to one or more insurance policies associated with one or more properties. Further, for example, in an exemplary circumstance wherein a third-party system is operated by a third-party entity that is a lender entity, the third-party system data comprises lender data, property data, and/or the like, as described herein. In various embodiments, third-party system data is stored at a third-party resource associated with the corresponding third-party system and is received and/or retrieved by a centralized data verification system in order to facilitate a verification operation. For example, a verification data structure comprises third-party system data.

The term "indicator" refers to one or more items of data associated with one or more elements of a verification system that indicates that a particular condition corresponding to the one or more elements associated therewith is present. In various embodiments, an indicator comprises a textual or graphical statement generated as a representation that a given condition is present. For example, in certain embodiments, an indicator is a data element comprising a flag, or a record of a data element whereby a logical "1" indicates that given condition is present and a logical "0" indicates that the given condition is not present. For example, in various embodiments, an indicator is a verified data structure indicator, an error indicator, an incomplete verification indicator, and/or the like, as determined and described herein.

"Data structure inquiry request routing data" in this context refers to data that included in a data structure inquiry request data packet generated by a verification system that identifies one or more actions to be performed by a third-party system on behalf of the verification system, such as, for example, the retrieval and subsequent transmittal to the verification system of various third-party system data. The data structure inquiry request routing data is utilized by the verification system to appropriately route a data structure inquiry request data packet to an appropriate proxy endpoint to trigger a third-party system to execute one or more operations, such as, for example, a retrieval of provider data associated with the third-party system and/or a transmission of at least a portion of the retrieved provider data to the verification system. In certain embodiments, data structure inquiry request routing data is further utilized by the third-party system to identify any additional data that should be transmitted to the verification system, such as, for example, an error indicator indicative of a missing, nonexistent, and/or erroneous data. In certain embodiments, data structure inquiry request routing data provides instructions that function as an indication to a third-party system of the networked location to which a verification data structure is to be transmitted to the verification system.

The term "payload data" refers to data forming a portion of a data packet, as discussed herein, that provides a third-party system and/or a verification system that receives the data packet with information required by the receiving system in order for the receiving system to execute the one or more instructions defined by the routing data of a data packet. In certain embodiments, the payload data comprises one or more data identifiers, data structures, data elements, and/or the like (e.g., message text, files attached to an exchanged message, a plurality of discrete exchanged messages, and/or the like). For example, in certain embodiments, payload data defining a portion of a data structure inquiry request data packet comprises a data structure identifier identifying a particular property and/or a particular insurance policy that is the subject of a verification workflow to be executed by the verification system. In certain embodiments, payload data comprises a data structure identifier provided to a third-party system by the verification system via a data packet in response to a trigger event initiating a verification operation associated with that data structure identifier, such that the third-party system receiving the data packet identifies third-party system data associated with the data structure identifier to be retrieved and/or transmitted to the verification system as part of a verification data structure.

Data structures retrieved, received, transmitted, and/or otherwise stored by the centralized data verification system in various circumstances (e.g., provided by a particular third-party system, verified for a particular third-party system, and/or the like) are identified and/or indexed by the verification server within one or more "data verification tables." Data verification tables are made up of various data structures stored at the system repository of the verification system. For example, in certain embodiments, the data structures provided within a data verification table are indexed by the verification system such that the data verification table is constructed, organized, and/or presented based at least in part on a plurality of data elements associated with a common data structure identifier that collectively define a supported data structure.

In some embodiments, each of the supported data structures provided in a data verification table are associated with the same third-party identifier. As a further non-limiting example, in certain embodiments, each of the data structures provided in a data verification table are associated with one or more error indicators, such that the data verification table embodies a table of data structures, each of which may be associated with a "call-out" indicating that that data structure requires manual attention and/or action of one or more users in order to further the corresponding verification operation. In certain embodiments, a supported data structure within a data verification table is updated, such as, for example, upon execution of a verification workflow associated with a data structure identifier associated with a supported data structure present within the data verification table. As noted herein, in certain circumstances, a data verification table comprising an indexed listed of supported data structures organized by one or more data elements respectively defining each of the listed supported data structures embodies a subset of all the supported data structures stored within the verification system repository.

"Proxy endpoint" in this context refers to a data transfer interface, for example, an Application Program Interface (API) between unconnected computing systems via a network. A proxy endpoint embodies a data transfer interface such as an API configured to enable communication between the verification system and a third-party system via the API. For example, a proxy endpoint enables data transfer of one or more data packets (comprising routing data and/or payload data) between a verification system and a third-party system associated with data (e.g., insurance policy data, policy information, property information, and/or the like) corresponding to a data structure identifier associated with a supported data structure stored at a verification system repository of the verification system. In various embodiments, a proxy endpoint is defined at least in part by a URL accessible to the third-party system via one or more devices associated with the third-party system, wherein the URL may be utilized to direct the third-party system to a particular dataset (e.g., one or more data packets) or and/or data request. As discussed herein, a data packet (e.g., data structure inquiry request data packet) provided to a third-party system via a proxy endpoint comprises data formatted to enable and/or request usage by the third-party system to perform a desired operation and/or provide a requested data element, data structure, and/or the like. In certain embodiments the proxy endpoint enables real-time retrieval of data from the third-party system by the verification system. In various embodiments, the proxy endpoint is configured to enable the verification system to pull data from the third-party system upon the workflow of a trigger event acting to inform the verification system of the presence of data that is ready for retrieval. Further, in certain embodiments, the proxy endpoint is configured to enable the third-party system to transmit data to the verification system upon the workflow of a trigger event acting to inform the third-party system of the presence of data that is ready for transmission.

The term "provider," "provider entity," "carrier," and similar terms are used interchangeably herein to refer to any company or agency that provides a guarantee of compensation for specified loss or damage in return for payment of a premium. In various embodiments, a provider entity is associated with a third-party system operated by the provider entity, which generates and/or stores provider data and is in communication with a centralized data verification system. Providers include insurance carriers, data aggregators (e.g. companies or services which aggregate loan data, insurance data, property data, tax data, weather data, and other data), financial institutions that sell insurance, and/or the like. For example, in certain embodiments, a verification workflow executed by the centralized data verification system is defined in part by the verification system requesting and receiving provider data associated with a data structure identifier identifying a particular property from a third-party system operated by a provider entity, such that the verification system can verify, on behalf of a lender entity, the accuracy and/or completeness of a supported data structure defined by various provider data and/or policy data associated with the particular property and the provider entity.

A "lender," a "lender entity," and similar terms are used interchangeably to refer to any company, business, organization, or agency that makes funds available to another for purchase or financing of a particular property according to certain terms and with the expectation that the funds will be repaid, generally plus any interest and/or fees. Lender entities specifically include banks, financial institutions, underwriters, brokers, and others in the lender chain. In various embodiments, a lender entity is associated with a third-party system operated by the lender entity, which generates and/or stores lender data and is in communication with the centralized data verification system. For example, in various embodiments, lender data includes, lender name, originator name, loan status, investor, mortgage processor, loan number, escrow balance, escrow status, etc. As a non-limiting illustrative example, a lender associated with a property located at 123 Peachtree Street, Atlanta, GA 30318 may be Lender ABC.

The term "loan identifier" is used to refer to one or more items of data by which a particular loan transaction, loan account, and/or loan associated with a transaction relating to a particular property and financed by a third-party entity that is a lender entity is uniquely identified. For example, in certain embodiments, a loan identifier comprises ASCII text, a pointer, a memory address, and/or the like. In various embodiments, a loan identifier is indexed and/or associated by a verification system with a property identifier, a third-party identifier associated a lender entity associated with the third-party system, and/or any other loan data for purposes of identification, record-keeping, and data organization. For example, in various embodiments, a loan identifier includes a loan name, a loan reference number, a loan timestamp, a borrower name, and/or the like.

A "borrower" and similar terms are used interchangeably to refer to a person, firm, agency, and/or the like that has agreed to pay a debt, has an obligation to perform, and/or the like. As described herein, a borrower is a party to a loan transaction relating to a particular party through which the borrower is granted a loan by a third-party entity that is a lender entity for a payment associated with the particular property. In certain embodiments, borrower data associated with the borrower defines at least a portion of a supported data structure associated with a property identifier, and includes, for example, borrower name, age, mailing address, borrower status (e.g., current, delinquent, etc.), company affiliation, co-borrower name, bankruptcy filing status, and/or the like.

The term "loan transaction" and similar terms are used interchangeably to refer to a transaction relating to a loan for a payment associated with a particular property. In certain embodiments, the involves a debt evidenced by a note which specifies, among other things, the principal amount, interest rate, and date of repayment.

A "coverage plan" and similar terms are used interchangeably to refer to the scope of protection provided under a service contract, insurance policy, warranty and/or the like that lists perils insured against, properties covered, locations covered, individuals insured, and/or the limits of indemnification. For example, a coverage plan may be a home insurance product placed on a property located at 123 Peachtree Street, Atlanta, GA 30318.

The term "property data" and similar terms is used interchangeably to refer to data related to any particular property, including data identifying particular land, structures, attached and/or integrated equipment, anything growing on the land, an easement across another's property, any descriptions thereof, any conditions thereof, weather, fire, and seismic events (e.g., earthquakes) associated with the property, and/or the like. In certain embodiments, property data includes, for example, a property legal description, building street name, building number, flood zone determination, appraised value, owner name, city, claims against the property for flood, fire, seismic events, and/or the like. For example, using the non-limiting illustrative example referenced above, property data relating to the property at issue defines a five-million dollar property value, a loan payment history that includes a loan repayment balance of two million dollars, an address of at 123 Peachtree Street, Atlanta, GA 30318, and an owner named Richard Rich. The property data includes 123 as the building number, Peachtree Street as the building street name, five million dollars as the appraised value, owner name as Richard Rich, the city as Atlanta, state as Georgia, loan payment history including the two million dollar repayment balance on the loan associated with the property, etc.

The term "property identifier" refers to one or more items of data that uniquely identifies a particular property, such as, for example, a parcel of land, a house, and/or the like. For example, in certain embodiments, a property identifier comprises ASCII text, a pointer, a memory address, and/or the like. In various embodiments, a property identifier is indexed and/or associated with a particular property by a centralized data verification system for purposes of data identification, data verification, record-keeping, and/or data organization. As non-limiting examples, in certain embodiments, property identifiers include a global positioning system (GPS) location, assessor's identification number, assessor's parcel number, property identification number, property account number, tax account number, sidwell number, longitude and latitude description, and/or the like. For example, the property identifier of the property located at 123 Peachtree Street, Atlanta, GA 30318 may be assessor's parcel number 0001-000-01-0000.

The terms "provider data," "policy data," and similar terms are used interchangeably to refer to data associated with a third-party entity (e.g., an insurance provider) and corresponding to an insurance policy that may be communicated to and/or processed by a verification system. In certain embodiments, provider data embodies data associated with an identifier that relates to an insurance policy providing coverage over a particular property, the provider data being initially stored at the third-party system operated by the third-party insurance provider and received by the verification system as part of a verification workflow. In certain embodiments, provider data includes data defining a data element and/or a collection of data defining a supported data structure that corresponds to, for example, an agent name, agent mailing address, annual premium, coverage type (e.g., homeowner's insurance, automobile insurance, flood insurance, condominium insurance, renter's insurance), and/or the like associated with an identifier of the particular insurance policy.

For example, in an exemplary circumstance wherein Carrier XYZ is a third-party entity that is an insurance provider offering a coverage plan associated with the property located at 123 Peachtree Street, Atlanta, GA 30318, provider data includes the name "David Jones," referring to the name of an insurance agent associated with an insurance policy (e.g., policy data, including a policy identifier embodying a data structure identifier) that sold the insurance coverage plan offered by Carrier XYZ to an owner of the property in the example above. For example, using the non-limiting illustrative example referenced above, provider data and/or policy data may include data relating to an insurance policy relating to one or more properties, such as, for example, data indicating that a coverage amount is five-million dollars, a deductible amount of five thousand dollars, a replacement cost coverage policy configuration, a first property address of at 123 Peachtree Street, Atlanta, GA 30318, and an owner named Richard Rich. By way of further example, using the non-limiting illustrative example referenced above, provider data and/or policy data may include data relating to an insurance policy relating to a plurality of properties, such as, for example, data indicating that the coverage amount is ten-million dollars, a deductible amount of ten thousand dollars, a replacement cost coverage policy configuration, a first property address of at 123 Peachtree Street, Atlanta, GA 30318, a second property address of at 123 Piedmont Street, Atlanta, GA 30319, and an owner named Richard Rich.

In certain embodiments, a verification data structure transmitted from the third-party system associated with the insurance provider to the verification system in response to a verification data structure inquiry request as part of a verification operation is defined by provider data and/or policy data. The verification data structure comprises provider data and/or policy data associated with the data structure identifier (e.g., a property identifier) provided by the verification system along with the verification data structure inquiry request that the third-party system received. Policy data comprises data associated with a particular insurance policy, such as, for example, at least a portion of the property data associated with the particular property that is the subject property of the insurance policy. For example, in certain embodiments, a supported data structure is comprised of policy data embodied as one or more data elements corresponding to an insured party name (e.g., surname), an insured property street address, an insured property zip code, and/or the like.

The term "criteria of interest" and similar terms are used interchangeably herein to refer to one or more parameters, characteristics, queries, or items of information that may be of interest to a user, entity, system, and/or the like, such that they are queried against various data generated by the centralized data verification system. In certain embodiments, a criterion of interest is embodied by, for example, an error indication, verified data indicator, third-party identifier, and/or the like that is associated with a supported data structure (e.g., associated with policy data) that is stored at the verification system repository.

System Architecture

Methods, apparatuses, systems, and computer program products of the present disclosure may be embodied by any of a variety of devices in various system architectures. For example, the method, apparatus, system, and computer program product of an example embodiment may be embodied by one or more network devices, such as a server or other entity, configured to communicate with one or more devices, such as subscriber devices, third-party devices, or the like, and one or more third-party servers. Example embodiments include a variety of networked devices operating as servers. Additionally, or alternatively, embodiment methods, apparatuses, systems, and/or computer program product of an example embodiment may be embodied by one or more software modules configured to perform some or all of the operations performed disclosed herein and executed on one or more hardware modules or systems, such as one or more servers connected to a network.

In this regard, FIG. 1 is a schematic block diagram of an example verification system that may be specially configured to communicate with one or more third-party systems according to embodiments of the present disclosure. As illustrated, in various embodiments, an exemplary verification system 100 (e.g., the verification server 110) may be configured to communicate with each of a plurality of third-party systems, such as, for example, third-party systems 200A, 200B, 200N, 300, via various wireless or wired communication networks 140.

Communication network 140 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 108 may include a cellular telephone, an 802.11, 802.16, 802.20, and/or WiMax network. Further, a communication network 140 may include a public network, such as the Internet, a private network, such as an intranet, or combinations thereof, and may utilize a variety of networking protocols now available or later developed including, but not limited to TCP/IP based networking protocols.

As illustrated, the verification system 100 may include at least one verification server(s) 110 accessible via the communication network 140. Collectively, the at least one verification server(s) 110 is configured for receiving data from one or more third-party systems, converting one or more data structures received from various third-party systems 200A, 200B, 200N, 300 to a supported format, indexing the one or more data structures and storing the indexed data structure at a system repository for purposes of data identification, record-keeping, and data organization. The verification server 110 of a verification system 110 may be configured, utilizing means such as one or more software and/or hardware modules, to perform various data storage processes and/or execute various operations in order to facilitate the execution of one or more verification workflows, as described herein. For example, in various embodiments, the verification server 110 may process various data structures comprising property data, lender data, and/or provider data retrieved from various third-party systems (e.g., to verify aspects of an insurance policy), payment information (e.g., to verify insurance policy payment data), and/or other data associated with property insurance, a property loan architecture, and/or the like.

Moreover, the verification system 100 encompasses one or more system repositories 120, which may define one or more cache memory storage areas and/or one or more long term storage areas, such as for storing various data structures (e.g., comprising various property data, policy data, loan data, and/or the like) or historical data associated with a data structure identifier. In various embodiments, historical data associated with a data structure identifier may indicate one or more previous interactions, iterations, updates, modifications, and/or verification workflows associated with a data structure identifier. The system repository 120 includes information accessed and stored by the verification server 110 to facilitate one or more operations of the verification server (e.g., a verification operation) of the verification system 100. For example, the verification repository 120 may include, without limitation, a plurality of data structures stored in a supported format and indexed based at least in part on one or more data elements associated therewith, and/or the like.

In various embodiments, an exemplary verification system 100 may further include one or more system devices 130 configured for communication with the verification server 110 and associated with a verification entity that operates the verification system 100 and/or a system user that is associated with the verification entity. In various embodiments, For example, the one or more devices 130 may comprise a As described herein, the networked system device associated with a user identifier having have specific verification system employee credentials or adequate permissions to access and/or modify various data structures stored by the verification system. As described herein, the one or more devices 130 may be in electronic communication with the verification server 110 and the system repository 120.

In various embodiments, the one or more third-party systems in electronic communication with the verification system 100 may be a software program, application, platform, or service that is provided by way of a remote device, such as a server or processing device, maintained by a third-party individual, company, or organization, and which is configured to communicate with the verification system. In various embodiments, a third-party system may communicate with the verification system, and vice versa, through one or more application program interfaces (APIs). In some embodiments, the third-party system may receive tokens or other authentication credentials that are used to facilitate secure communication between the third-party system and the verification system in view of verification system network security layers or protocols (e.g., network firewall protocols).

Further, in various embodiments, a third-party system may communicate with the verification system, and vice versa, by exploiting blockchain technology, such that the verification system 100 is configured for maintaining one or more blockchain implementations that store data associated with functionality accessed via and/or operations of the verification system 100 (e.g., associated with a verification workflow). In general, blockchains may be applied for recording transactions, transmissions, executed operations, and/or the like without relying on a centralized element. In some embodiments, supported data structures and/or contextual data related thereto (e.g., timestamps, identifiers, and/or the like) may be stored in a distributed ledger that is updated, verified, and stored in a decentralized manner to enable the verification system and/or one or more third-party systems with authorized access the distributed ledger to view and/or edit the ledger for purposes of maintaining and/or verifying the accuracy of the supported data structure relative to policy data and/or property data stored externally by various third-party systems. In this regard, the blockchain(s) may embody an immutable, trusted, and accurate representation of data transmissions that have been initiated, actioned upon, and/or completed via the verification system 100. In various embodiments, the networked communication between the verification system 100 (e.g., the verification server) and a third-party system may be defined at least in part by blockchain system wherein the verification system 100 and the third-party system each comprise a node computing entity (not shown). For example, the verification system 100 and/or a third-party system in communication therewith may be a node computing entity that stores the entirety of a distributed ledger (e.g., a blockchain) and/or maintains the distributed ledger by publishing updated records, entries, blocks and/or the like. In various embodiments, a third-party system may comprise a lightweight node computing entity that does not store the entirety of the distributed ledger (e.g., a blockchain).

In various embodiments, the verification system 100 may be configured to use a separate distributed ledger (e.g., a plurality of blockchains) for each third-party system (e.g., each provider entity system, each lender entity system), each supported data structure (e.g., each property), and/or the like, and may selectively limit edit access to authorized parties independently for each ledger. For example, in various embodiments, the verification system 100 may store and maintain a first distributed ledger for a first supported data structure associated with a first property identifier that is accessible to a first third-party system (e.g., a lender entity system), and a second distributed ledger for a second supported data structure associated with a second property identifier that is accessible to a second third-party system (e.g., a lender entity system). By way of further example, the verification system 100 may maintain a third distributed ledger for a third third-party system (e.g., a provider entity system) associated with a plurality of supported data structures (e.g., each associated with a respective policy identifier). The verification system 100 may interact with each blockchain to generate an immutable and accurate record of any additions, modifications, and/or updates to a supported data structure, accompanied by an indication of the input being associated with a particular system, device, and/or user profile (e.g., the verification system, an authorized third-party system or a device associated therewith, a system device associated with the verification system, and/or the like), transmissions of data (e.g., at least a portion of a supported data structure) between the verification system and an authorized third-party system, contextual data (e.g., indicators, identifiers, timestamps, and/or the like) associated with one or more verification workflows related to a supported data structure that have been executed by the verification system 100, and/or the like, as the verification system interacts with the supported data structures and the third-party systems described herein.

Figure 2:
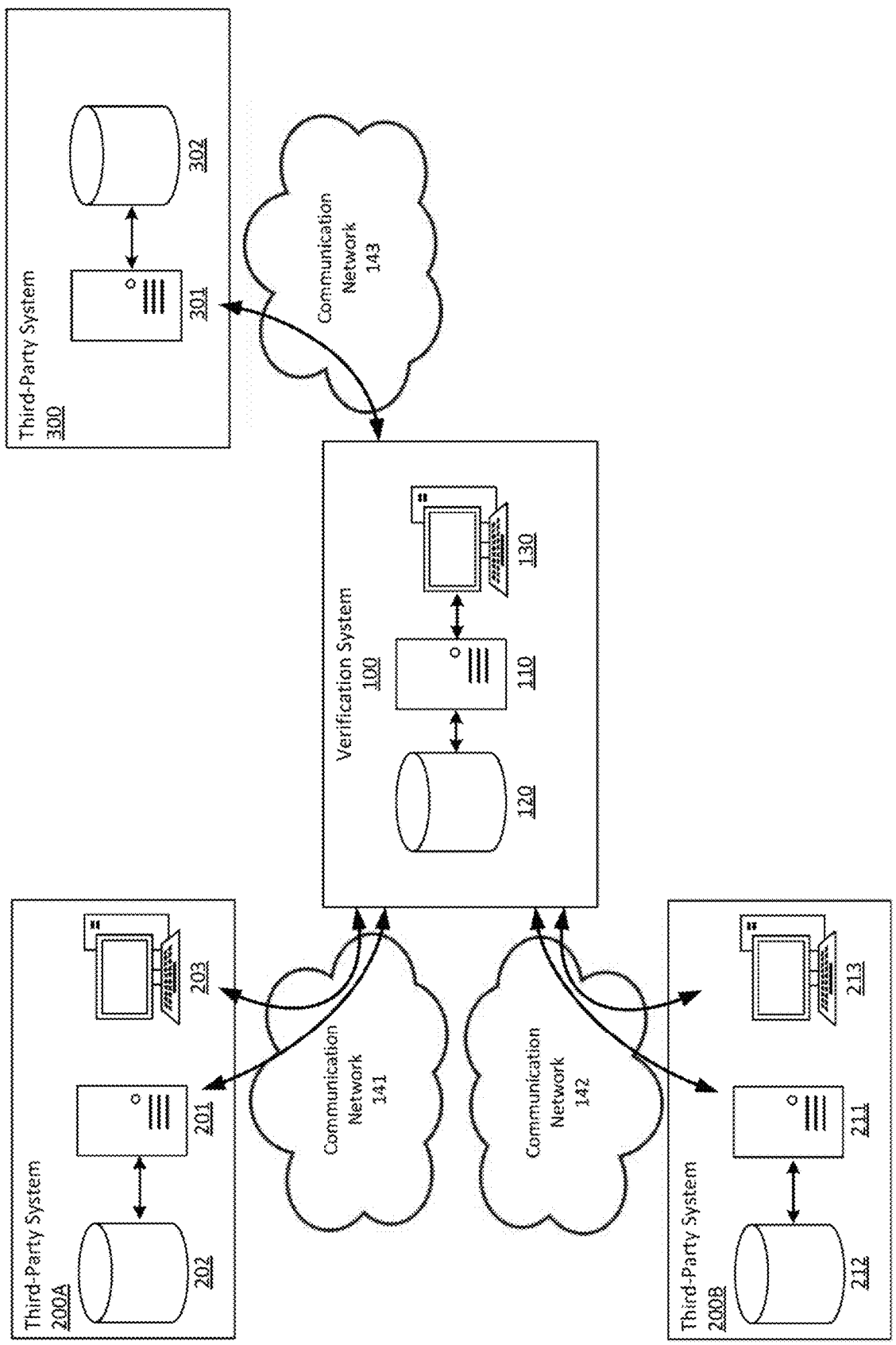
FIG. 2 illustrates a block diagram of a centralized data verification system that may be specifically configured, within which embodiments of the present disclosure may operate.

As described herein, a third-party system may include a third-party resource and a third-party repository. For example, as illustrated in FIGS. 1 and 2, the verification system 100 may be configured for electronic communication with each of a first third-party system 200A, a second third-party system 200B, a third third-party system 200N, and a fourth third-party entity 300, each of which may include a respective third-party resource 201, 211, 221, 301 and a third-party repository 202, 212, 222, 302 that is communicable with the respective third-party resource of the corresponding third-party system. Further, in various embodiments, a third-party system may include one or more devices configured for communication with the third-party resource associated with the corresponding third-party system and associated with the third-party entity that operates the corresponding third-party system. For example, the first third-party system 200A, the second third-party system 200B, the third third-party system 200N may each include a respective device 203, 213, 223 that is communicable with the respective third-party resource of the corresponding third-party system.

As described herein, a third-party system may be associated with a third-party entity, such as, for example, a lender entity or an insurance provider entity. In various embodiments, wherein a third-party system is associated with and/or operated by a third-party entity comprising a provider entity, the third-party resource of the third-party system may comprise a server configured to execute one or more software applications that are associated with and/or facilitate various data transfer and data storage processes (e.g., the transfer and/or storage of provider data and/or property data) associated with maintaining a plurality of insurance policies for a plurality of customers relating to a plurality of distinct subjects (e.g., property). In various embodiments, wherein a third-party system is associated with and/or operated by a third-party entity comprising a lender entity, the third-party resource of the third-party system may comprise a server configured to execute one or more software applications that are associated with and/or facilitate various data transfer and storage processes (e.g., the transfer and/or storage of lender data and/or property data) associated with maintaining a plurality of loans for a plurality of customers relating to a plurality of distinct properties.

As depicted in FIG. 2, embodiments of the present disclosure further relate to the transmission, collection, storage, indexing, and aggregation of various data structures through a verification server 110 configured to electronically communicate with a plurality of third-party systems, including systems operated by lender entities, as well as those operated by provider entities, via respective communication networks to facilitate the execution of a low-latency verification operation with minimal user interaction. For example, as illustrated, the verification system 100 may communicate with the first third-party system 200A through a first communication network 141, with the second third-party system 200B through a second communication network 142, and with the fourth third-party system 300 through a third communication network 143. As described herein, each of the communication networks 141, 142, 143 may comprise a third-party-specific APIs through which the verification system may communicate with a particular one of the plurality of third-party systems.

Example Apparatuses of the Disclosure

Figure 3:
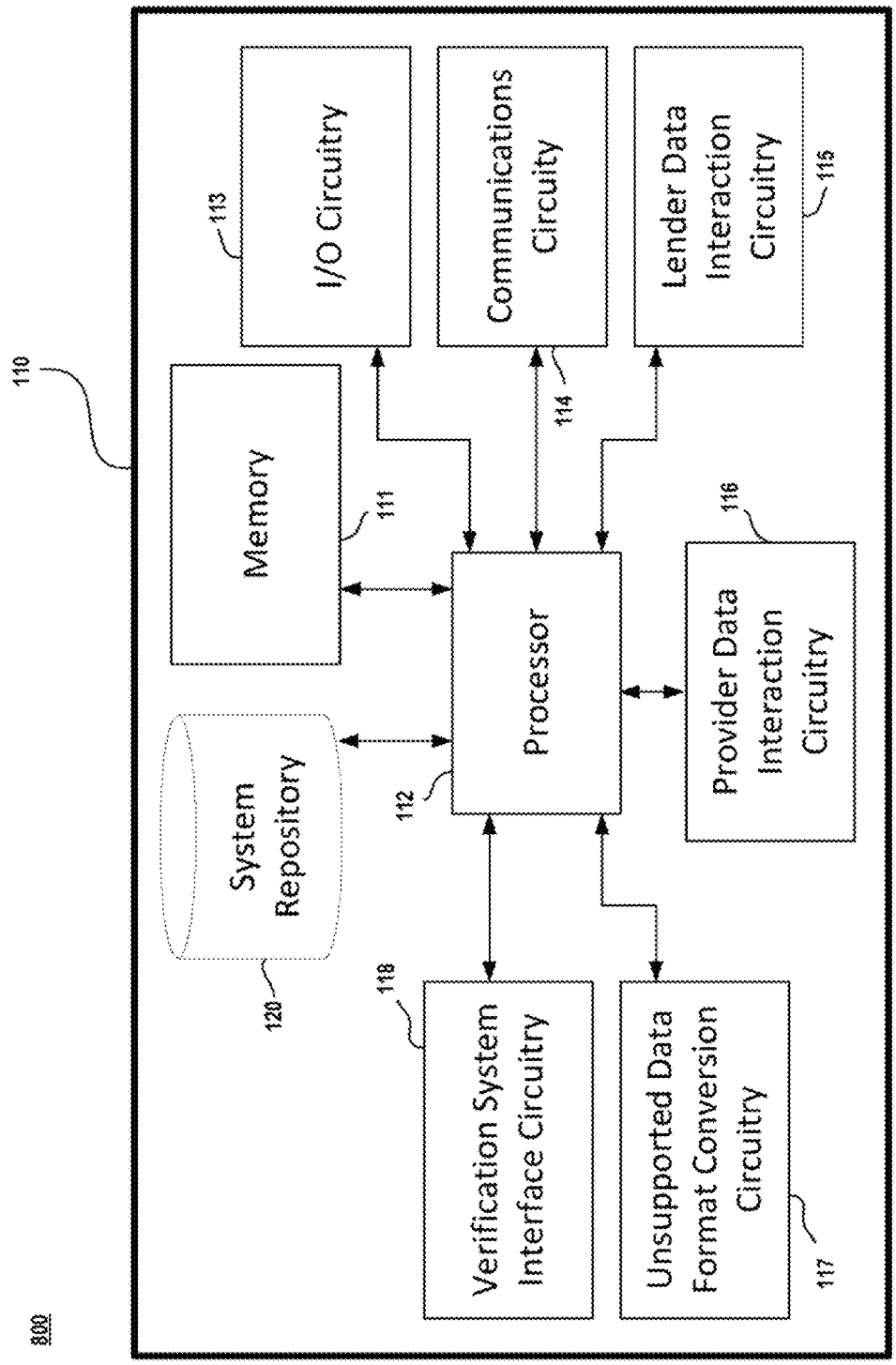
FIG. 3 illustrates a block diagram of an apparatus that may be specially configured in accordance with an example embodiment of the present disclosure.

Having discussed example systems in accordance with the present disclosure, example apparatuses in accordance with the present disclosure will now be described. In some embodiments, the verification system 100 as described herein with respect to FIGS. 1 and 2 is embodied by one or more computing systems. For example, in at least one embodiment, a verification server 110 of the verification system 100 may be defined at least in part by an exemplary apparatus, such as, for example, a controller, as depicted in FIG. 3. The verification apparatus 800 of the verification server 110 includes a processor 112, memory 111, input/output circuitry 113, communications circuitry 114, lender data interaction circuitry 115, provider data interaction circuitry 116, and unsupported data format conversion circuitry 117. Further, in various embodiments, an exemplary verification apparatus 800 may comprise a system repository 120. The verification apparatus 800 is configured, using one or more of the sets of circuitry 111, 112, 113, 114, 115, 116, and/or 117, to execute any one or more of the operations described herein.

Although components are described with respect to functional limitations, it should be understood that the particular implementations necessarily include the user of particular computing hardware. It should also be understood that certain of the components described herein may include similar or common hardware. For example, two sets of circuitry for example, may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the verification apparatus 800 may provide or supplement the functionality of another particular set of circuitry. For example, the processor 112 in some embodiments provides processing functionality to any of the sets of circuitry, the memory 111 provides storage functionality to any of the sets of circuitry, the communications circuitry 114 provides network interface functionality to any of the sets of circuitry, and/or the like.

In some embodiments, the processor 112 (and/or co-processor or any other processing circuitry assisting or otherwise associated with the processor) may be in communication with the memory 111 via a bus for passing information among components of the verification apparatus 800. In some embodiments, for example, the memory 111 is non-transitory and may include, for example, one or more volatile and/or non-volatile memories. In other words, for example, the memory 111 in some embodiments includes or embodies an electronic storage device (e.g., a computer readable storage medium). In some embodiments, the memory 111 is configured to store information, data, content, applications, instructions, or the like, for enabling the verification apparatus 800 to carry out various functions in accordance with example embodiments of the present disclosure.

The processor 112 may be embodied in a number of different ways. For example, in some example embodiments, the processor 112 includes one or more processing devices configured to perform independently. Additionally or alternatively, in some embodiments, the processor 112 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the verification apparatus 800, and/or one or more remote or "cloud" processor(s) external to the verification apparatus 800.

In an example embodiment, the processor 112 may be configured to execute instructions stored in the memory 111 or otherwise accessible to the processor. Alternatively or additionally, the processor 112 in some embodiments is configured to execute hard-coded functionality. As such, whether configured by hardware or software methods, or by a combination thereof, the processor 112 may represent an entity (e.g., physically embodied in circuitry) capable of performing operations according to an embodiment of the present disclosure while configured accordingly. Alternatively or additionally, as another example in some example embodiments, when the processor 112 is embodied as an executor of software instructions, the instructions may specifically configure the processor 112 to perform the algorithms embodied by the specific operations described herein when the instructions are executed.

In various embodiments, the processor 112 may include hardware, software, firmware, and/or a combination thereof, configured to support various aspects of the data indexing and insurance policy verification functionalities as described herein. As one particular example, the processor 112 may be configured to perform various operations embodying data structure verification functionality, such as, for example, a verification workflow. In this regard, the processor 112 in some embodiments is configured to perform and/or otherwise support the various functionality performed by the verification system 100, as described herein.

The input/output circuitry 113 provides output to the user and, in some embodiments, receives one or more indication(s) of user input. In some embodiments, the input/output circuitry 113 is in communication with processor 112 to provide such functionality. The input/output circuitry 113 includes one or more user interface(s) and/or includes a display that may comprise the user interface(s) rendered as a web user interface, an application interface, and/or the like, to the display of a user device, a backend system, or the like. In some embodiments, the input/output circuitry 113 may also include a keyboard, a mouse, a joystick, a touch screen, touch areas, soft keys, a microphone, a speaker, or other input/output mechanisms. The processor 112 and/or input/output circuitry 113 comprising or otherwise interacting with the processor 112 may be configured to control one or more functions of one or more user interface elements through computer program instructions (e.g., software and/or firmware) stored on a memory accessible to the processor 112 (e.g., stored on memory 111, and/or the like).

The communications circuitry 114 includes any device, circuitry, and/or other means embodied in hardware, software, firmware, and/or a combination of hardware, software, and software, that is configured to receive and/or transmit data from/to a network and/or any other device, circuitry, or module of or in communication with verification apparatus 800. In this regard, the communications circuitry 114 may include, for example, a network interface for enabling communications with a wired or wireless communication network. For example, the communications circuitry 114 in some embodiments includes one or more network interface card(s), antenna(s), bus(es), switch(es), router(s), modem(s), and supporting hardware and/or software, or any other device suitable for enabling communications via one or more communication network(s). Additionally or alternatively, in some embodiments the communications circuitry 114 includes circuitry for interacting with the antenna(s) and/or other hardware or software to cause transmission of signals via the antenna(s) or to handle receipt of signals received via the antenna(s).

The lender data interaction circuitry 115 includes hardware, software, firmware, and/or a combination thereof, configured to support various aspects of the data indexing and insurance policy verification functionalities, as described herein. In some embodiments, the lender data interaction circuitry 115 utilizes processing circuitry, such as the processor 112 and/or the like, to perform one or more of such actions. Additionally or alternatively, in some embodiments, the lender data interaction circuitry 115 may utilize input/output circuitry 113 to facilitate user output (e.g., causing rendering of one or more user interface(s)), and/or to receive user input (e.g., user clicks, user taps, keyboard interactions, user gesture, and/or the like). Additionally or alternatively still, in some embodiments, the lender data interaction circuitry 115 may utilize communications circuitry 114 to initiate transmissions to another computing device, receive transmissions from another computing device, communicate signals between the various sets of circuitry as depicted, and/or the like.

For example, in some embodiments, the lender data interaction circuitry 115 may include hardware, software, firmware, and/or a combination thereof, that receives various property data and/or loan data associated with a particular property from a third-party resource associated with and/or operated by a third-party entity comprising a lender entity. In some such embodiments, the lender data interaction circuitry 115 includes hardware, software, firmware, and/or a combination thereof, that, upon verification of an insurance policy associated with a particular property identifier, initiates transmission of a generated electronic communication comprising a verified data indicator and loan identifier associated with the property identifier corresponding to the particular property and to a third-party resource associated with a third-party identifier associated with the property identifier. Further, in some embodiments, the lender data interaction circuitry 115 includes hardware, software, firmware, and/or a combination thereof, that initiates transmission of a generated electronic communication to a third-party resources associated with a lender entity, the communication comprising a system report providing statistical data corresponding to at least a portion of the data structures stored at the verification repository 120 that are associated with the third-party identifier associated with the lender entity. It should be appreciated that, in some embodiments, the lender data interaction circuitry 115 may include a separate processor, specially configured field programmable gate array (FPGA), or a specially programmed application specific integrated circuit (ASIC), to perform such functionality.

The provider data interaction circuitry 116 includes hardware, software, firmware, and/or a combination thereof, configured to support various aspects of the data indexing and insurance policy verification functionalities as described herein. In some embodiments, the provider data interaction circuitry 116 utilizes processing circuitry, such as the processor 112 and/or the like, to perform one or more of such actions. Additionally or alternatively, in some embodiments, the provider data interaction circuitry 116 may utilize input/output circuitry 113 to facilitate user output (e.g., causing rendering of one or more user interface(s)), and/or to receive user input (e.g., user clicks, user taps, keyboard interactions, user gesture, and/or the like). Additionally or alternatively still, in some embodiments, the provider data interaction circuitry 116 may utilize communications circuitry 114 to initiate transmissions to another computing device, receive transmissions from another computing device, communicate signals between the various sets of circuitry as depicted, and/or the like.

For example, in some embodiments, the provider data interaction circuitry 116 may include hardware, software, firmware, and/or a combination thereof, that retrieves various policy data and/or property data associated with a particular policy, property, and/or the like from a third-party resource associated with and/or operated by a third-party entity comprising a provider entity. In various embodiments, the provider data interaction circuitry 116 may include hardware, software, firmware, and/or a combination thereof, that generates a data structure inquiry request data packet associated with a third-party identifier associated with a provider entity. Further, the provider data interaction circuitry 116 may include hardware, software, firmware, and/or a combination thereof, that initiates transmission of a generated data structure inquiry request data packet to a third-party resource associated therewith, and, further, facilitates the receipt of various signals, data packets, data structures, tokens, and/or the like received from the third-party system in response. It should be appreciated that, in some embodiments, the provider data interaction circuitry 116 may include a separate processor, specially configured field programmable gate array (FPGA), or a specially programmed application specific integrated circuit (ASIC), to perform such functionality.

The unsupported data format conversion circuitry 117 includes hardware, software, firmware, and/or a combination thereof, configured to support various aspects of the data indexing and insurance policy verification functionalities as described herein. In some embodiments, the provider data interaction circuitry 116 utilizes processing circuitry, such as the processor 112 and/or the like, to perform one or more of such actions. The unsupported data format conversion circuitry 117 may be any means such as a device or circuitry embodied in either hardware or a combination of hardware and software that is configured to convert the unsupported verification data structure received from the third-party resource into the supported format as a supported verification data structure using one or more validation rules. For example, in various embodiments, the unsupported data format conversion circuitry 117 may be configured to process data received by the verification server 110 in an unsupported format from a third-party system associated with a third-party entity comprising either a lender entity or a provider entity. Further, the unsupported data format conversion circuitry 117 may include hardware, software, firmware, and/or a combination thereof, that executes one or more executable instructions defining one or more validation rules so as to facilitate the conversion of a data structure defined by one of a plurality of unsupported structures to a supported structure configured to facilitate indexing and/or processing thereof. In various embodiments, the unsupported data format conversion circuitry 117 may utilize processing circuitry, such as the processor 112, to perform at least a portion of these actions. In various embodiments, the unsupported data format conversion circuitry 117 may send and/or receive data from verification system repository 120. In some implementations, the sent and/or received data may be one or more data structures comprising one or more data elements defined by property data, policy data, lender data, and/or the like that has been converted into a data structure comprising a supported format. It should also be appreciated that, in some embodiments, the unsupported data format conversion circuitry 117 may include a separate processor, specially configured field programmable gate array (FPGA), or application specific interface circuit (ASIC).

In various embodiments, the verification apparatus 800 may be configured with, or in communication with, a system repository 120. In various embodiments, an exemplary system repository 120 may comprise one or more databases configured for storing and/or indexing various data received, retrieved, generated, and/or otherwise made available to the verification system 100. In various embodiments, the system repository 120 may be stored, at least partially on the memory 111 of the verification system 100. In some embodiments, the system repository 120 may be remote from, but in connection with, the verification apparatus 800. The system repository 120 may contain information, such as data structures associated with a data structure identifier (e.g., a property identifier) and one or more third-party identifiers. In some embodiments, the system repository 120, and/or other similar reference databases in communication with the verification apparatus 800, may include a verification table that may categorize and/or organize at least a portion of the data structures stored at the system repository 120 based at least in part on each of the data structures within the table being defined by a common data element, identifier, indicator, and/or the like.

It should be appreciated that, in some embodiments, one or more of the sets of circuitry 111-117 are combinable. Alternatively or additionally, in some embodiments, one or more of the sets of circuitry performs some or all of the functionality described associated with another set of circuitry. For example, in some embodiments, the provider data interaction circuitry 116 may be combined with the processor 112, such that the processor 112 performs one or more of the operations described above with respect to the lender data interaction circuitry 115.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows

Figure 4A:
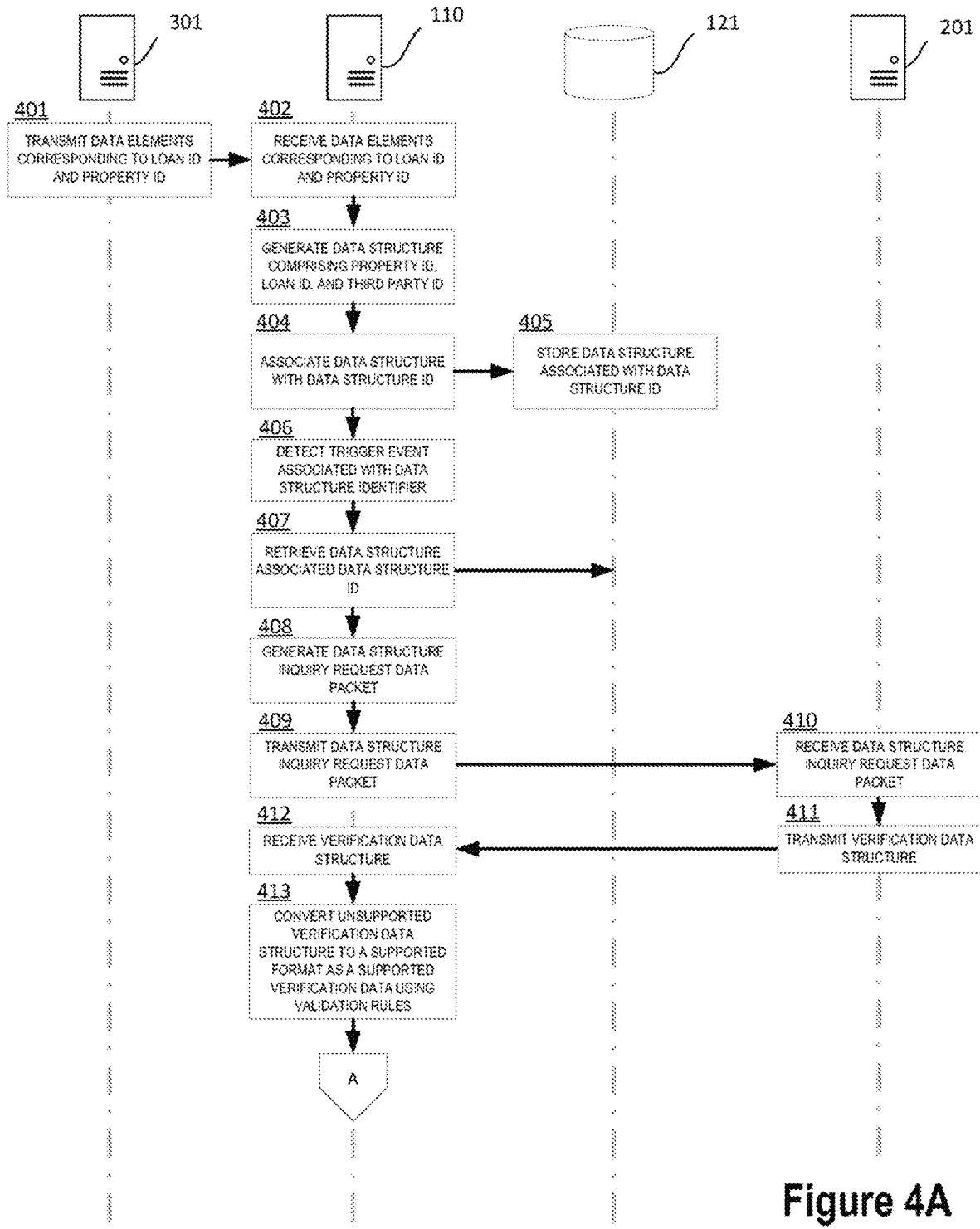
FIGS. 4A and 4B illustrate a lane diagram showing functionality of various components in accordance with various embodiments.
Figure 4B:
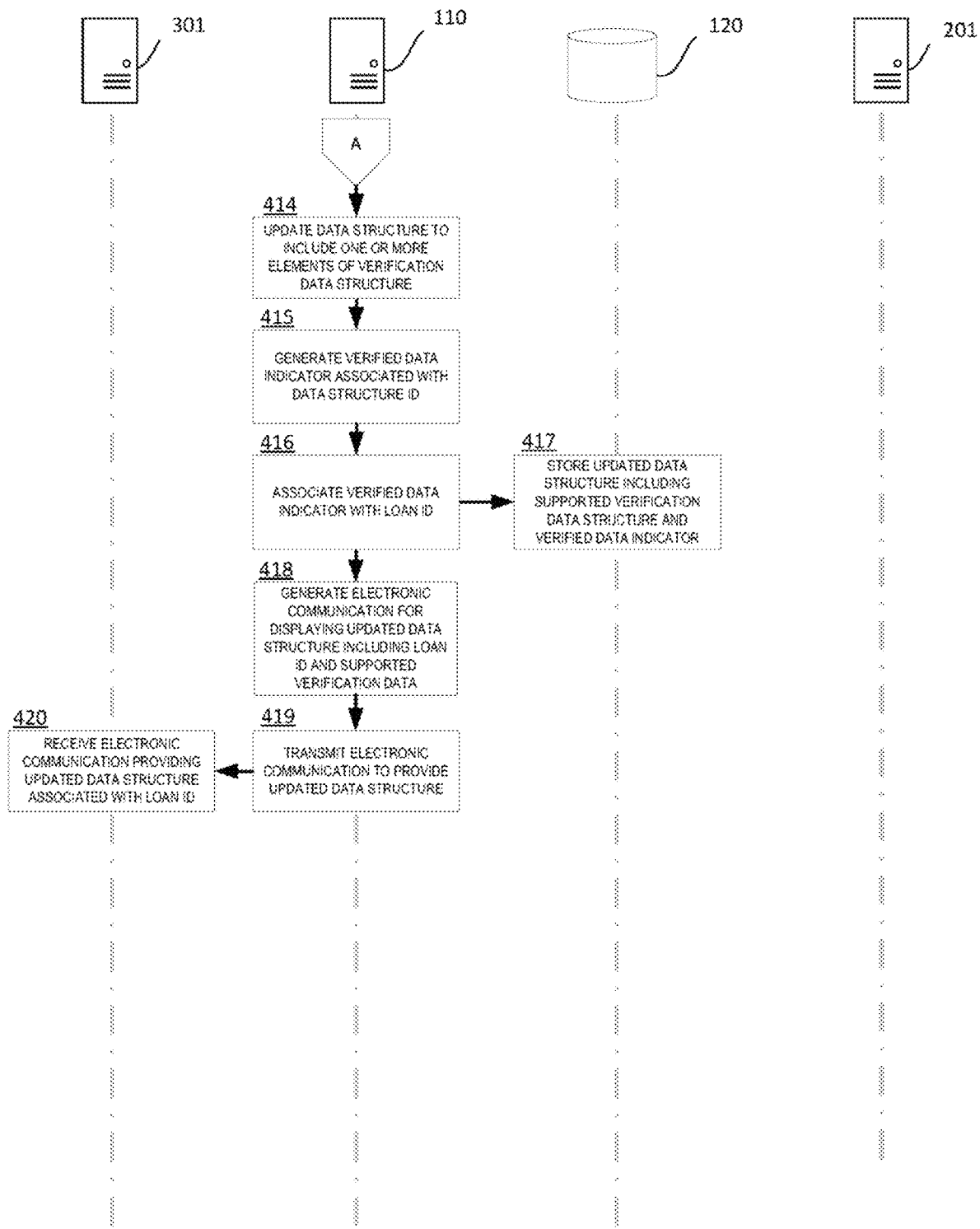

FIGS. 4A and 4B illustrate a lane diagram showing functionality of various components in accordance with various embodiments. In particular, FIGS. 4A and 4B provide a lane diagram that illustrates at least a portion of the executable actions and communicative signals provided between various components of an exemplary verification system and other third-party systems in communication therewith. For example, the illustrated lane diagram details at least a portion of the operations executed and communication signals processed by the verification server 110 and system repository 120 during an exemplary verification operation according to various embodiments. In various embodiments, an exemplary verification system may be associated with and/or operated by a verification entity, as described herein. Further, an exemplary verification system may be configured for communication with at least one third-party system operated by an external organization or business (i.e. an organization or business other than the verification entity), so as to facilitate a transfer of data between a verification server 110 of the verification system and a third-party resource of the third-party system.

As illustrated in FIGS. 4A and 4B, in various embodiments, a verification server 110 may be electronically communicate with each of a plurality of third-party systems, such that data may be respectively transmitted between the verification server 110 and each of a plurality of third-party resources corresponding, respectively, to the plurality of third-party systems. As a non-limiting example, in various embodiments, a third-party system may be operated by a lender entity (e.g., a "lender") such that the third-party resource of the third-party system embodies a lender entity server. As a further non-limiting example, in various embodiments, a third-party system may be operated by a provider entity (e.g., an "insurance provider") such that the third-party resource of the third-party system embodies a provider entity server. In the exemplary embodiment represented by the lane diagram of FIGS. 4A and 4B, the verification server 110 of the exemplary verification system is configured to communicate with each of a first third-party resource 201 of a first third-party system and a second third-party resource 301 of a second third-party system. For example, as shown, the first third-party resource 201 may comprise a provider entity server associated with an external insurance provider and the second third-party resource 301 may comprise a lender entity server associated with an external lender. The illustrated lane diagram details various operations executed by each of the first third-party resource 201 and the second third-party resource 301, and schematically illustrates the transmission of various communications between each third-party resource 201, 301 and the verification server 110.

As shown in Blocks 401 and 402, a verification server 110 of the verification system may receive one or more data elements corresponding to a loan identifier and a property identifier (e.g., and/or a policy identifier) transmitted from a third-party system (e.g., a third party resource 301) associated with a lender entity. As described herein, the one or more data elements received by the verification server 110 may define at least a portion of the data stored by a third-party system. For example, the one or more data elements may comprise data stored at third-party system repository associated with the third-party system and in communication with the third-party resource 301, such as, for example, property data stored that is stored by the lender entity relating to a parcel of land and/or stored lender data relating to a loan, loan transaction, and/or loan account. As described herein, in various embodiments, the verification server 110 may receive property data (e.g., a property identifier), policy data (e.g., a policy identifier), and/or a combination thereof, and, further, may be configured to execute one or more combining, merging, and/or harmonizing steps with respect to corresponding data elements of various property data and policy data received from a third party system.

Although specifically illustrated in FIG. 4A with respect to the receipt of property data and/or policy data from a third-party system (e.g., a third party resource 301), in various embodiments, the verification server 110 may receive one or more data elements defining property data, policy data, and/or a combination thereof from any of the various systems, servers, devices, and/or the like in communication therewith, such as, for example, a device associated with the third-party resource 301 associated with the lender entity, one or more system devices associated with the verification system 100 (e.g., internal data inputs), a third-party resource 201 associated with a provider entity, a device associated with the third-party resource 201 (e.g., data input to the verification system by an insurance agent), an additional external third party resource operated by an additional third-party entity and in communication with a third-party resource 201 and/or a third-party resource 301 that is authorized by the third-party resource 201 and/or the third-party resource 301 to facilitate a transmission of policy data and/or property data associated therewith, and/or the like.

In various embodiments, upon receiving the one or more data elements form the third-party resource 301, the verification server 110 may generate a data structure comprising a plurality of data elements corresponding to the one or more data elements received from the third-party resource 301, as shown at Block 403. For example, in various embodiments, the data structure generated by the verification server 110 may comprise the property identifier and the loan identifier corresponding to the one or more data elements received from the third-party resource 301, as well as a third-party identifier associated with the third-party system. In various embodiments, the third-party identifier may comprise one or more items of data by which the third-party system and/or the lender entity associated therewith may be uniquely identified within the verification system 100, such as, for example, a textual indication of the name of the lender entity. In various embodiments, the verification server 110 may associate each of the data elements with a respective data element identifier.

In various embodiments, as shown at Block 404, the verification server 110 may associate a data structure identifier with the data structure generated at Block 403 such that the data structure comprises the data structure identifier. In various embodiments, associating the data structure with the generated data structure may comprise the verification server 110 associating the data structure identifier with each of the data element identifiers associated with the one or more data elements included in the generated data structure.

As shown at Block 405, in various embodiments, the verification server 110 may transmit the data structure associated with the data structure identifier and comprising a one or more data elements corresponding to at least a portion of the data received from the third-party resource 301, such as, for example, a property identifier, a loan identifier, a third-party identifier, and/or the like, to a system repository 120 associated with the verification system for storage. For example, in various embodiments, the data structure associated with the data structure identifier may be stored at the system repository 120 in a verification table. As described herein, a verification table may categorize and/or organize at least a portion of the data structures stored at the system repository 120 based at least in part on each of the data structures within the table being defined by a common data element, identifier, indicator, and/or the like. As a non-limiting example, in such an exemplary circumstance, a verification table may be configured to identify each of the data structures stored at the system repository 120 that are associated with a particular third-party identifier or an error indicator. As described in further detail herein, the verification server 110 may index a data structure within the verification table based at least in part on the one or more of the plurality of data elements.

As shown at Block 406, the verification server 110 may detect a verification trigger event. As described herein, a verification trigger event may comprise an action, incident, collection of steps, or processes executed by the verification server 110, a third-party system (e.g., third-party resource 301), a networked device associated therewith, and/or the like that initializes the execution of one or more verification operations by the verification server 110. A verification triggering event may be detectable by the verification server 110 and may be associated with a data structure identifier, a third-party identifier, and/or the like. In various embodiments, verification triggering events may be pre-defined, such as, for example, scheduled workflows or operations (e.g., via an identified timestamp or expiration of a relative timer), button clicks, received signals and/or commands, and/or the like, or may be learned by the verification system (e.g., the verification server 110) over time using machine learning models or other similar techniques. In various embodiments, upon detecting a verification triggering event associated with a data structure identifier, the verification server 110 may retrieve the data structure associated with the data structure identifier from the system repository 120, as shown at Block 407. In various embodiments, upon detecting a verification triggering event, the verification server 110 may generate a verification workflow identifier that uniquely identifies the particular verification workflow initiated by the verification trigger event associated with the data structure identifier. In various embodiments, the verification server 110 may associate the generated verification workflow identifier with the data structure identifier. Alternatively, or additionally, in various embodiments, an exemplary verification system 100 may be configured such that at least a portion of the data stored at a system repository 120 may be updated via one or more automated processes such that at least a portion of the plurality of supported data structures stored within the verification system 100 (e.g., at the system repository 120) may be updated via one or more data communication operations scheduled for execution at set time intervals (e.g., a table within the system repository 120 that is automatically updated daily, weekly, monthly, and/or the like).

As shown at Block 408, the verification server 110 may generate a data structure inquiry request data packet comprising at least a portion of the data structure associated with the data structure identifier associated with the detected verification trigger event. As described herein, the generated data structure inquiry request data packet may be configured to be transmitted to one or more third-party systems. For example, in various embodiments, a data structure inquiry request data packet may comprise data structure inquiry request routing data and payload data. In various embodiments, data structure inquiry request routing data may be utilized by the verification server 110 to identify and/or appropriately route the data structure inquiry request data packet to an appropriate proxy endpoint to trigger a third-party resource 201 to perform one or more actions to facilitate the execution of a verification operation, as described herein. In various embodiments, the verification server 110 may configure the data structure inquiry request data packet in accordance with one or more formatting and/or content requirements of a particular third-party resource 201. In various embodiments, the verification server 110 may assemble routing data for the data structure inquiry request data packet to comprise (1) one or more verification tokens, (2) a data structure identifier, (3) a third-party identifier, (4) one or more data element identifiers, (5) a verification workflow identifier, (6) a timestamp indicating when the verification data structure is requested, and/or the like.

In various embodiments, data structure inquiry request the routing data included in a data structure inquiry request data packet may identify the one or more actions to be performed by a third-party resource 201 on behalf of the verification server 110, such as, for example, the retrieval and subsequent transmittal to the verification system of various data stored at a third-party system repository based at least in part on the payload data provided within the data packet in order to facilitate the execution of the verification operation. For example, the payload data may at least identify a particular subset of data stored by the third-party system that is being requested by the verification system, such as, for example, a data structure identifier, property identifier, data element identifier, and/or the like, or any combination thereof. For example, the data structure inquiry request data packet may be configured for transmission to a third-party resource 201 associated with a third-party system operated by a provider entity such that the payload data may provide, for example, a property identifier that identifies a particular property (e.g., parcel of land), and the data structure inquiry request routing data may provide instructions to the third-party resource 201 to provide various policy data associated with an insurance policy relating to the particular property and maintained through the provider entity (e.g., data relating to an insurance coverage plan). In various embodiments, a data structure inquiry request data packet may comprise at least one verification token associated with the verification server, a third-party identifier, a verification workflow identifier, and a data structure identifier.

As shown at Blocks 409 and 410, the verification server 110 may transmit the data structure inquiry request data packet to the third-party resource 201 associated with the third-party system operated by a provider entity, which may be configured to receive the transmitted data packet from the verification server 110. For example, the verification server 110 may provide the data structure inquiry request data packet to the third-party resource 201 via a proxy endpoint, which may be identified by the routing data included in the data structure inquiry request data packet. In various embodiments a proxy endpoint may provide an API for passing the data structure inquiry request data packet from the verification server 110 to the third-party resource 201, thereby enabling the third-party resource 201 to consume the routing data and/or the payload data provided within the data packet. The data included within the data structure inquiry request data packet, including a verification token associated with the verification workflow identifier is passed to the third-party resource 201, for example, using the API to provide the data to the third-party resource 201 in a format that may be consumed by the third-party resource 201.

Transmitting a data structure inquiry request data packet to the third-party resource 201 causes the third-party resource 201 to identify and retrieve various third-party system data that is stored at a third-party system repository and corresponds to at least a portion of the data included in the data packet (e.g., the payload data).

Upon retrieving the third-party data based at least in part on the payload data provided with the data structure inquiry request data packet, the third-party resource 201 may transmit a verification data structure comprising the retrieved third-party data to the verification server 110, as shown at Blocks 411 and 412. For example, in various embodiments, the third-party resource 201 may transmit the verification data structure to the verification server 110 via a proxy endpoint identified by the data structure inquiry request routing data and/or the verification token included in the transmitted data packet. In various embodiments, a verification data structure may comprise various policy data associated with an insurance policy relating to the particular property that was identified by the property identifier provided with the data structure inquiry request data packet. As described herein, a verification data structure may be defined by one or more data elements corresponding respectively to each of a plurality of policy characteristics that may define an insurance policy relating to the identified property, such as, for example, property name, policyholder name, policy status, policy start date, policy end date data, policy holder data, policy financial data, policy type data, and/or the like. In various embodiments, the verification data structure may further include a third-party identifier associated with the third-party resource 201 that uniquely identifies the third-party entity (e.g., the provider entity) associated with the third-party resource 201. In various embodiments, the verification data structure transmitted to the verification system 110 by the third-party system 201 may be further accompanied by a verification token associated with the third-party identifier, the data structure identifier, and the verification workflow identifier. Based at least in part on the verification token received in conjunction with the verification data structure, the verification server 110 may associate at least a portion of the verification data structure with the verification workflow identifier and/or the data structure identifier, as described herein.

In various embodiments, the verification data structure received by the verification server 110 may include data indicative of either a missing data structure or an inconsistent data element. For example, as described in further detail herein, in an exemplary scenario wherein the third-party system associated with the third-party resource 201 does not have any stored data associated with data structure identifier (e.g., a property identifier) provided in the data structure inquiry request data packet, the verification data structure received by the verification system may comprise a missing data structure, element, indicator, and/or the like. As a non-limiting illustrative example, in such various circumstances where a third-party resource 201 associated with a provider entity does not maintain an insurance policy relating to the particular property identified in the data structure inquiry request data packet, the third-party resource 201 may transmit a verification data structure that includes data, such as, for example, a data element, token, indicator, and/or the like, that indicates to the verification system 110 that the requested policy data is not available to the third-party resource 201.

As described herein, the verification data structure transmitted from the third-party resource 201 may be received by the verification server 110 in an unsupported format. For example, in various embodiments, based at least in part on the hardware and software platform utilized by the third-party system, third-party system data stored at the third-party repository associated with the third-party system and accessed by the third-party resource 201 may be defined by a format that is incompatible, inappropriate, and/or not utilized by the verification system 110 in the context of verification operation. Accordingly, in such an exemplary circumstance, the verification data structure received by the verification system 110 may be received in a format that is different than the format of the verification system data stored at the system repository 120, (e.g., an "unsupported" format). As shown at Block 413, the verification server 110 may be configured to may convert the unsupported verification data structure received from the third-party resource into the supported format as a supported verification data structure using one or more validation rules. For example, upon being converted to a supported format by the verification server 110, the verification data structure may define a supported verification data structure. As described herein, the supported format utilized by the verification server 110 may enable the verification system to be operable using various third-party system data (e.g., verification data structures) received from a plurality of different third-party systems—each of which may be configured to operate using a respective unsupported format—that has been converted into a singular format supported by the verification server 110.

In various embodiments, wherein the verification data structure received by the verification server comprises one or more data elements, the verification server 110 may be configured to identify each of the one or more data elements as corresponding to a particular data element characteristic, such as, for example, a property name, a property street address, a property zip code, a policyholder name, a policy status, a policy start date, a policy end date, a policy type, and/or the like. In various embodiments, upon identifying the one or more data elements as being present within the received verification data structure, the verification server may be configured to assign the values defining each of the identified data elements to a corresponding data element identifier associated with a data structure identifier, so as to catalog and/or organize the various data elements into a data structure having a supported format. As described herein, the supported format of the supported verification data structure may facilitate one or more verification operations, such as, for example, by enabling the integration and aggregation of corresponding data from various third-party systems (e.g., lender systems and provider system) that, individually, have no means of communication and/or data transfer therebetween.

In various embodiments, a verification server 110 may include a rules engine configured to, upon receiving one or more verification data structures in an unsupported format, execute a data mapping function so as to facilitate the conversion of the unsupported data structure to a supported data format. As a non-limiting example, provided for illustrative purposes, the verification server 110 may be configured to receive a first verification data structure defined by a first unsupported data format from a first third-party system, and a second verification data structure defined by a second unsupported data format from a second third-party system. For example, in an exemplary circumstance wherein both the first unsupported second verification data structure and the second unsupported verification data structure each include data elements corresponding to an insurance agent name, the first unsupported verification data structure may provide such data in the first unsupported data format (e.g., "name: 'John Doe'"), and the first unsupported verification data structure may provide such data in the first unsupported data format (e.g., "First Name: 'Jenny'; Last Name: 'Smith'"). The verification server 110 may be configured to execute one or more validation rules (e.g., data mapping functions) with respect to each of the first unsupported verification data structure and the second unsupported verification data structure, so as to convert them into a supported data format for storage within the verification system 100 as elements of a first supported data structure (e.g., "AgentName: 'Doe, John'") and a second supported data structure (e.g., "AgentName: 'Smith, Jenny'"), respectively. As a further non-limiting example, in an exemplary circumstance wherein both the first unsupported second verification data structure and the second unsupported verification data structure each include data elements corresponding to an property zip code, the first unsupported verification data structure may provide such data in the first unsupported data format (e.g., "zip": "12345-1234"), and the first unsupported verification data structure may provide such data in the first unsupported data format (e.g., "zip": "678906789").

In various embodiments, the verification server 110 may execute one or more validation rules (e.g., data mapping functions) with respect to each of the first unsupported verification data structure and the second unsupported verification data structure, so as to convert them into a supported data format for storage within the verification system 100 as elements of a first supported data structure (e.g., "Zipcode: '12345_1234'") and a second supported data structure (e.g., "Zipcode: '67890_6789'"), respectively. In various embodiments, the verification system 100 may execute at least a portion of the data mapping architecture algorithmically, programmatically, and/or via one or more machine learning processes that analyzes the differences between the supported data format and one or more unsupported data formats. Further, in various embodiments, a verification system 100 (e.g., a verification server 110) may generate one or more validation rules, executable instructions, mapping, other schema, and/or the like, associated with a particular third party system (e.g., a provider system operated by a provider entity) based at least in part on the specific unsupported data format used by that particular third-party system to store data within the third-party system. For example, the verification server 100 may generate a specific mapping that is unique to a third-party system (e.g., a provider system) such that the verification server 110 may automatically apply the particular mapping generated for a specific third-party system upon receiving an unsupported verification data structure from that third-party system.

Figure 7:
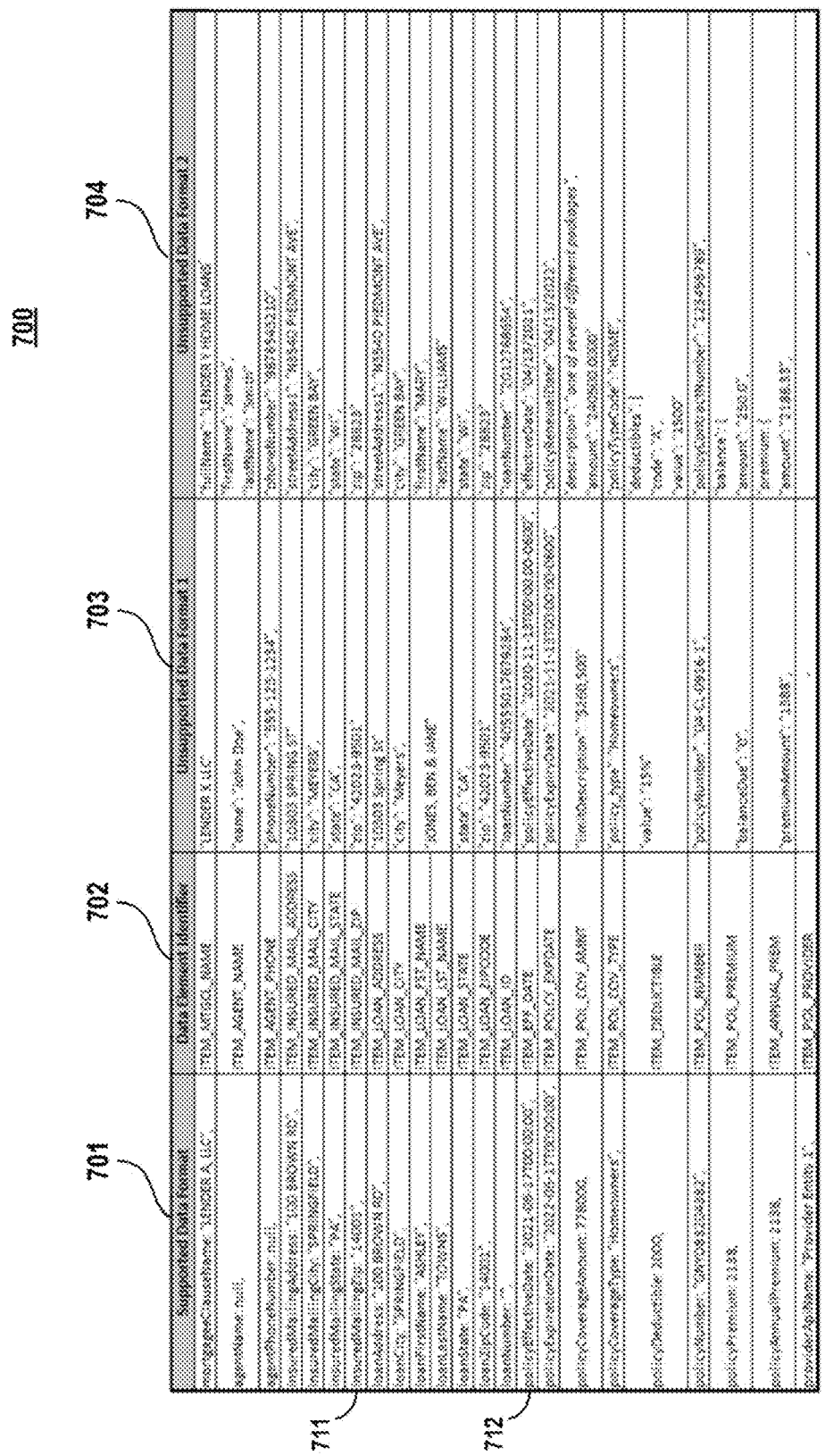
FIG. 7 illustrates a table of exemplary data that may be accessed by a centralized data verification system and stored as a supported data structure according to various embodiments.

As an illustrative example of mapping that may be stored by the centralized data verification system, FIG. 7 shows a table of exemplary data that may be accessed by a centralized data verification system and stored as a supported data structure according to various embodiments. A verification server of may be configured to store a table 700 to facilitate a data mapping function as described herein. In various embodiments, an exemplary data mapping table 700 may include a plurality of columns, at least a portion of which may correspond to data provided in the supported data format, and one or more of which may correspond to data provided in an unsupported data format. Further, in various embodiments, an exemplary data mapping table 700 may include one or more rows, each row corresponding to a respective data element, such that at least a portion of the one or more rows of an exemplary data mapping table 700 includes data defining a first data element formatted in a supported data format in a first column and data defining the first element data formatted in an unsupported data format in a second column.

In one example, as illustrated in FIG. 7, the illustrated data mapping table 700 comprises a plurality of rows, each of which is comprised of data corresponding to a respective data element. The depicted data mapping table 700 comprises a first column 701 comprised of a plurality of supported data elements provided in the supported data format utilized by the verification system, as described herein. In various embodiments, a supported data structure, as described herein, may comprise at least a portion of the plurality of supported data elements provided in the first column 701. The data mapping table 700 further comprises a third column 703 comprised of a corresponding plurality of unsupported data elements provided in a first unsupported data format utilized by a first third-party system associated with a first third-party entity (e.g., a first provider entity), and a third column 703 comprised of a corresponding plurality of unsupported data elements provided in a second unsupported data format utilized by a second third-party system associated with a second third-party entity (e.g., a second provider entity).

Each row of the exemplary data mapping table 700 corresponds to a respective data element, such that a first row corresponding to a first data element includes data from a first column 701 corresponding to the first data element that is stored in the supported data format (e.g., a supported data element), and data corresponding to the first data element from the at least one additional column that is stored in an unsupported data format (e.g., an unsupported data element). Further, in various embodiments, a data mapping table 700 may include a column (e.g., second column 702) populated by data element identifiers associated, respectively, with the data in each of the one or more rows. For example, row 711 from data mapping table 700 includes a supported data element from first column 701 that provides data showing a mailing zip code of insured party in a supported data format, a data element identifier from second column 702 that is associated with the supported data element and identifies the common data element (e.g., mailing zip code) that corresponds to each data in row 711, a first unsupported data element from third column 703 that provides data showing a mailing zip code of an insured party in a first supported data format, and a second unsupported data element from fourth column 704 that provides data showing a mailing zip code of an insured party in a second supported data format. By way of further example, row 712 may include a second supported data element from first column 701 that provides data showing an effective date of an insurance policy in a supported data format, a data element identifier from second column 702 that may be associated with the supported data element and identifies the common data element (e.g., effective date of an insurance policy) that corresponds to each data in row 712, a third unsupported data element from third column 703 that provides data showing an effective date of an insurance policy in the first supported data format, and a fourth unsupported data element from fourth column 704 that provides data showing an effective date of an insurance policy in the second supported data format.

In various embodiments, such validation rules, executable instructions, mapping, and/or other schema, may be created, for example, algorithmically, programmatically, and/or via one or more machine learning processes that are configured to analyze differences between the supported data format and the unsupported data format that defines the unsupported verification data structure received from the third-party system. In some embodiments, gaps in such validation rules, executable instructions, mappings, and/or schema can be identified and programmatically filled through continuous and iterative re-training of one or more machine learning models.

At Block 414, the verification server 110 may update the data structure associated with the data structure identifier to include at least a portion of the supported verification data structure. For example, in an exemplary circumstance wherein the verification data structure includes one or more verification data elements corresponding to data and/or information associated with a data structure identifier (e.g., a property identifier) that was previously unavailable and/or unknown to the verification server 110, the verification server 110 may update the data structure associated with the data structure identifier to include the previously unavailable one or more verification data elements. As described herein, the data structure and the aforementioned previously unavailable one or more verification data elements may collectively define an updated supported data structure associated with the data structure identifier.

As shown at Block 415, the verification server 110 may generate a verified data structure indicator associated with the data structure identifier. For example, in various embodiments, the verification server 110 may generate a verified data structure indicator upon determining that a verification data structure received from the third-party resource 201 did not consist of any data structure errors and, further, provided all of the data requested by the verification server 110 via the data structure inquiry request data packet such that the data structure associated with the data structure identifier is not defined by any missing, inconsistent, or otherwise erroneous data elements. In various embodiments, the verification server 110 may associate the generated verified data indicator with the data structure identifier, so as to indicate that the verification workflow associated with the data structure identifier has been completed (e.g., that each of the verification operations defining the verification workflow have been executed) such that the data structure associated with the data structure identifier embodies a verified data structure. In various embodiments, a verification token received by the verification server 110 from the third-party resource 201 along with the verification data structure may comprise one or more executable instructions configured to cause the verification server 110 to execute one or more verification operations, such as, for example, generating a verified data indicator associated with the data structure identifier with which the verification token is associated.

As shown at Block 416, the verification structure may further associate the generated verified data indicator associated with the data structure identifier with the loan identifier that is associated with the same data structure identifier. In various embodiments, the verified data indicator associated with the loan identifier that is associated with the data structure identifier may be utilized by the verification system to indicate to the third-party entity that operates the third-party resource 301 (e.g., the lender entity) that the data structure associated with the provided loan identifier has been verified by the verification system. For example, in various embodiments, an updated supported data structure may be further updated to include the verified data indicator.

As shown at Block 417, the verification server 110 may transmit the updated supported data structure associated with the data structure identifier and comprising the verified data indicator associated with the data structure identifier and the loan identifier to the system repository 120 for storage. For example, the updated supported data structure may be stored in a data structure storage location configured to store data elements, data structures, indicators, and/or the like associated with a particular data structure identifier. By way of further example, the updated supported data structure may alternatively or additionally be stored in a data structure storage location that associated with the third-party identifier associated with the third-party resource 301 and configured to store data elements, data structures, indicators, and/or the like associated with the third-party identifier, which may be accessible to the third-party resource 301. In various embodiments, each third-party resource associated with a lender entity, such as, for example, third-party resource 301, may have its own data structure storage location defined within the system repository 120, wherein data may be selectively stored by the verification server 110 within said storage location based on the data being associated with the third-party identifier associated with the third-party resource 301. In various embodiments, upon associating the verified data indicator with a loan identifier and storing a data structure defined in part by the verified data identifier, verification server 110 may generate a verification confirmation data packet configured to transmit various data indicative of a confirmation that a verification data structure associated with a data structure identifier was received and/or that a supported data structure associated with the data structure identifier was updated. For example, in various embodiments, the verification server 110 may transmit a verification confirmation data packet to at least one third party resource, such as, for example, a third-party resource 301 associated with the lender entity and/or a third-party resource 201 associated with the provider entity from which the verification data structure associated with the data structure identifier was received.

In various embodiments, upon associating the verified data indicator with a loan identifier and storing a data structure defined in part by the verified data identifier, verification server 110 may generate an electronic communication configured to present for display at one or more devices associated with a third-party resource 301 associated with the lender entity at least a portion of the updated supported data structure associated with the data structure identifier, as shown at Block 418. For example, in various embodiments, the verification server 110 may generate an electronic communication configured to present for display at a third-party device associated with the third-party resource 301 a loan identifier associated with the data structure identifier, one or more data elements defining the data structure associated with the loan identifier, such as, for example, the data elements received by the verification server 110 via the verification data structure, and/or the like. As shown at Blocks 419 and 420, the verification server 110 may transmit the generated electronic communication comprising the loan identifier associated with the verified data indicator to the third-party resource 301, which may be configured to receive the electronic communication. Additionally or alternatively, in various embodiments, the verification server 110 may transmit the generated electronic communication comprising the loan identifier associated with the verified data indicator to one or more networked devices associated with the third-party identifier associated with the lender entity. In various embodiments, the transmission of the generated electronic communication comprising a verified data indicator associated with the loan identifier associated with the data structure identifier may embody an at least substantially automated process triggered by the verification server 110 associated a verified data indicator with the data structure identifier associated with the loan identifier.

It should be understood that FIGS. 4A and 4B relate to an exemplary circumstance wherein the verification server 110 communicates with a singular third-party resource 201 associated with and/or operated by a provider entity (e.g., a provider entity server) via the transmission of various data in order to facilitate the execution of a verification operation relating to a data structure. Additionally, or alternatively, in various embodiments, a verification server 110 may be configured to facilitate a two-way communication between the verification system and a third-party system associated with the lender entity. For example, verification server 110 may be configured to facilitate a two-way data transmission between the verification server 110 and the third-party resource 201 (e.g., and/or a device associated therewith), wherein the verification server 110 may push data, such as, for example, policy data, property data, and/or a combination thereof, to the third party resource 201. As a particular, non-limiting example, a verification server 110 may be configured to transmit at least a portion of a supported data structure, such as, for example, data relating to information about a lender entity's policies, rules, preferred procedures, and/or other operational guidelines to a third-party resource 201 associated with a provider entity. As a further non-limiting example, in various embodiments, a verification server 110 may be configured to transmit at least a portion of a supported data structure, such as, for example, an informative notification and/or message including data configured to communicate a confirmation, an update, a notice, and/or the like relating to one or more system events to a system device associated with the verification system 100, a third party resource 201 associated with a provider entity (e.g., a device associated therewith), a third party resource 301 associated with a lender entity (e.g., a device associated therewith), and/or the like.

Further, in various non-limiting embodiments, a verification server 110 may communicate with a plurality of third-party resources (e.g., a plurality of provider entity servers), each associated with and/or operated by a respective provider entity. In such an exemplary circumstance, the verification server 110 may communicate with each of the plurality of provider entity servers, in order to facilitate the execution of one or more verification operations triggered by a verification triggering event. For example, in various embodiments wherein a verification workflow is initiated relating to a data structure associated with a third-party identifier associated with a lender entity and comprising one or more data elements defined at least in part by property identifier corresponding to a parcel of land that is the subject of a loan financed by the lender entity, the verification server 110 may generate a plurality of data structure inquiry request data packets, each associated with a respective one of the plurality of provider entity servers in communication with the verification server 110. The verification server 110 may provide a respective data structure inquiry request data packet to the plurality of third-party resources via respective proxy end points. In various embodiments, each proxy endpoint may provide an API that facilitates the noninvasive, on-demand transfer of data between the verification system and the respective third-party system (e.g., the provider entity server).

As a non-limiting illustrative example, in an exemplary circumstance wherein the verification server 110 does not have access to data indicating whether an insurance policy relating to the parcel of land has been purchased by the borrowers (e.g., the landowners), and/or indicating the identity of the provider entity that provides the insurance policy relating to the parcel of land, the verification server 110 may provide a plurality of data structure inquiry request data packets to a plurality of provider entity servers in order to identify which, if any, of the plurality of lender entities associated therewith provides the insurance policy relating to the parcel of land financed by the lender entity. For example, in such an exemplary circumstance, the verification system may determine that a particular provider entity is associated with the property identified in the distributed data packets based at least in part on the verification data packets received. In particular, the verification system may determine that a particular provider entity is associated with the property identified in the data packets based on a determination that the verification data structure received from the third-party system does not comprise any data structure errors indicative of a missing data structure. Alternatively, or additionally, as a further non-limiting illustrative example, the verification server 110 may initiate a verification workflow relating to each of a plurality of data structures associated with the same third-party identifier associated with a lender entity. For example, the verification server 110 may execute such an exemplary verification workflow in order to provide a consolidated communication to the third-party system associated with the lender entity that includes a verification status for each of the plurality of data structures relating to the plurality of properties that are each the subject of a respective loan financed by the lender entity. In such an exemplary circumstance, the verification server 110 may identify the provider identifiers associated with each of the respective data structures associated with the lender identifier based at least in part on the data structure stored at the system repository. In various embodiments, the verification server 110 may provide a data structure inquiry request data packet associated with a respective one of the plurality of data structures associated with the provider identifier to each of the provider entity servers associated with a third-party identifier that is associated with the corresponding data structure identifier. In various embodiments, the verification server 110 may provide a plurality of data structure inquiry request data packets to a plurality of provider entity servers associated with a plurality of provider entities via a respective plurality of distinct proxy endpoints wither in parallel or at least substantially sequentially (e.g., in series).

Figure 5:
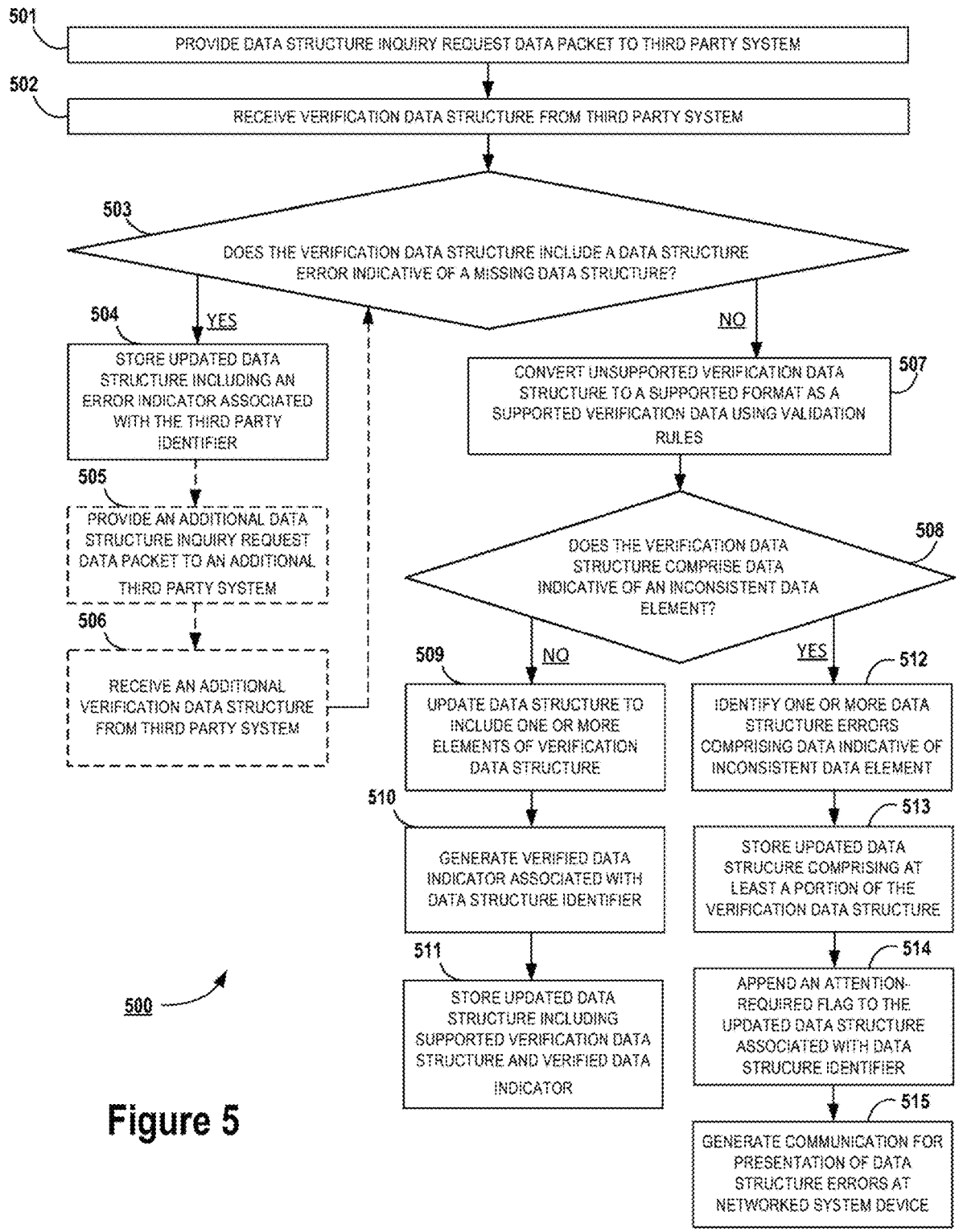
FIG. 5 illustrates a flowchart depicting operations performed in accordance with an example embodiment of the present disclosure.

In various embodiments, a verification workflow may include one or more operations wherein, upon receiving a verification data structure associated with a data structure identifier from a third-party system associated with a provider entity, the verification system (e.g., a verification server) may execute one or more verification operations in order to verify the accuracy and/or completeness of data included in the verification data structure. FIG. 5 provides a flowchart illustrating various operations performed in accordance with an example embodiment of the present disclosure. In particular, FIG. 5 illustrates an exemplary method 500 of verifying at least a portion of a data structure, via a verification server, which may analyze a verification data structure received from a third-party resource and, accordingly, execute one or more verification operations in order to facilitate a verification workflow.

As shown at Blocks 501 and 502 of FIG. 5, and as described in further detail herein, an exemplary verification server may provide a data structure inquiry request data packet comprising a data structure identifier associated with a data structure to a third-party resource associated with a third-party entity, such as, for example, a provider entity. Further, upon retrieving various third-party data stored at the third-party repository, the third-party system may transmit a verification data structure comprising provider data associated with the data structure identifier to the verification system based at least in part on the data structure inquiry request data packet. In various embodiments, the operations illustrated by Blocks 501 and 502 comprise at least substantially the same steps and verification system components as described herein in reference to Blocks 409 and 412, respectively, of FIG. 4A.

Upon receiving the verification data structure from third-party system associated with the provider entity, the method 500 continues at Element 503 with determining whether the verification data structure received from the third-party system (e.g., via a third-party resource associated therewith) comprises one or more data element errors indicative of a missing data structure. In various embodiments, a data element error may be defined by an absence of one or more requested data elements within a verification data structure received from a third-party resource, an inconsistency between one or more data elements within the verification data structure and a corresponding data element associated with the same data structure identifier and stored within a system repository of the verification system, and/or any other data characteristic defined within the verification data structure that causes the verification system to be unable to execute one or more verification operations. In various embodiments, a verification system (e.g., a verification server) may receive a verification data structure from a third-party system that includes data indicative of either a missing data structure or an inconsistent data element. In various embodiments, the verification system (e.g., a verification server) may be configured to identify one or more data element errors within a verification data structure and determine an error classification that defines the one or more errors (e.g., missing data structure error, inconsistent data element error) based at least in part on one or more algorithmic, statistical, and/or machine learning models. For example, a verification server may determine that a verification data structure comprises a missing data structure in an exemplary circumstance wherein the verification data structure is embodied by empty data and/or fails to include any data elements associated with the data structure identifier provided within the data structure inquiry request data packet. As a non-limiting illustrative example, in an exemplary circumstance wherein the third-party system that receives the data structure inquiry request data packet does not does not have any stored data associated with data structure identifier (e.g., a property identifier) included in the data structure inquiry request data packet, the verification data structure received by the verification system from that third-party system may comprise empty data. In such an exemplary circumstance, the verification system may determine the verification data structure comprises a data structure error indicative of a missing data structure.

In various exemplary circumstances wherein the verification server determines that the verification data structure received from the third-party system comprises a data structure error indicative of a missing data structure, method 500 continues at Block 504, with the verification server storing an updated supported data structure associated with the data structure identifier that includes an error indicator associated with the third-party identifier at a system repository. In various embodiments, the error indicator may be generated by the verification system upon the determination that the verification data structure provided by the third-party resource associated with the third-party identifier was determined to include a data structure error defined at least in part by a missing data structure. For example, the error indicator may comprise a missing data structure error indicator. Further, in various embodiments, the error indicator may be further associated with a verification workflow identifier.

In an example embodiment, wherein the verification server determines that the verification data structure received from the third-party system comprises a data structure error indicative of a missing data structure and stores an updated supported data structure associated with the data structure identifier that includes an error indicator associated with the third-party identifier at the system repository, the verification server may further provide an additional data structure inquiry request data packet to an additional third-party system associated with a different third-party entity, as illustrated at Block 505 In such an example embodiment, the additional third-party system to which the verification server provides the additional data structure inquiry request data packet may be associated with a different third-party entity, such as, for example, a second provider entity associated with a second third-party system configured to receive the data structure inquiry request data packet from the verification system. In various embodiments, the verification server may transmit to the second third-party system an additional data structure inquiry request data packet (e.g., a second data structure inquiry request data packet) that is at least substantially similar to the data packet transmitted to the first third-party system in the operation described herein with respect to Block 501. Further, in such an example embodiment, upon retrieving various third-party data stored at the third-party repository associated therewith, the second third-party system may transmit an additional verification data structure comprising provider data associated with the data structure identifier to the verification system based at least in part on the additional data structure inquiry request data packet. As shown at Block 506, the additional verification data packet may be received by the verification server in such an exemplary circumstance.

Returning back to Element 503, in various exemplary circumstances, the verification server may determine that the verification data structure received from the third-party system does not comprise any data structure errors indicative of a missing data structure. For example, a verification server may determine that a verification data structure received from a third-party system does not comprise any data structure errors indicative of a missing data structure based at least in part on a determination that the verification data structure comprises of one or more data elements associated with the data structure identifier and the third-party system. For example, in an exemplary circumstance wherein a verification data structure received from a third-party system comprises one or more data elements requested by the verification system via the transmitted data structure inquiry request data packet, the verification structure may determine that the verification data structure received from the third-party system does not comprise a data structure error comprising a missing data structure error.

Upon determining that the verification data structure received from the third-party system does not comprise any data structure errors indicative of a missing data structure, method 500 continues at Block 507, with the verification server converting the verification data structure received from the third-party resource and defined by an unsupported data format into a supported format as a supported verification data structure using one or more validation rules. In various embodiments, the operations illustrated by Block 507 comprises at least substantially the same steps and verification system components as described herein in reference to Block 413 of FIG. 4A.

Upon converting the unsupported verification data structure received from the third-party resource into a supported verification data structure, the method 500 continues at Element 508 with determining whether the verification data structure received from the third-party system (e.g., via a third-party resource associated therewith) comprises one or more data element errors indicative of an inconsistent data element. For example, in various embodiments, the verification server may be configured to compare one or more data elements included in the verification data structure received from the third-party system to a corresponding one or more elements included in the data structure associated with the same data structure identifier stored at the system repository. As a non-limiting illustrative example, the verification server may be configured to identify a data element included in the verification data that defines a street address associated with a particular property associated with a data structure identifier. The verification server may be configured to execute a comparison of the street address data element included in the verification data structure to a corresponding street address data element associated with the data structure identifier that is stored at the system repository. For example, the verification server may be configured to execute similar comparison operations with respect to a plurality of data elements included in the verification data structure, such as, for example, a comparison of a land owner last name data element as provided in a verification data structure by a provider entity to a stored land owner last name data element associated with the data structure identifier that is stored on the system repository; a comparison of a zip code data element as provided in a verification data structure by a provider entity to a zip code data element associated with the data structure identifier that is stored on the system repository; and/or the like. In various embodiments, the verification server may determine either that each of the data elements provided in the verification data structure have values that are at least substantially equal to that of a corresponding data element stored by the verification system, or that one or more of the data elements is defined by a value that is inconsistent with that of the corresponding data element of the stored data structure.

In various exemplary circumstances wherein the verification server determines that the verification data structure received from the third-party system does not comprise any data structure errors indicative of an inconsistent data element, method 500 continues at Block 509, with the verification server updating the data structure associated with the data structure identifier to include at least a portion of the supported verification data structure. Upon updating the data structure associated with the data structure identifier, method 500 continues at Block 510, with the verification system generating a verified data structure indicator associated with the data structure identifier. Further, upon generating the verified data indicator associated with the data structure identifier, the method continues at Block 511, with the verification system storing the updated supported data structure comprising the data structure identifier and the verified data indicator at a system repository associated with the verification system. In various embodiments, the operations illustrated by Blocks 509, 510, and 511 comprise at least substantially the same steps and verification system components as described herein in reference to Blocks 414, 415, and 417, respectively, of FIG. 4B.

Returning back to Element 509, in various exemplary circumstances, the verification server may determine that the verification data structure received from the third-party system comprises a data structure error indicative of an inconsistent data element the verification data structure received from the third-party system does not comprise any data structure errors indicative of a missing data structure.

In various embodiments, as described herein, a verification data structure may be determined to comprise data indicative of an inconsistent data element in an exemplary circumstance wherein one or more of the data elements included in the verification data structure have a value that is not equivalent to the corresponding data element associated with the data structure identifier that is stored on the system repository. In such an exemplary circumstance, a data element provided in the verification data structure having a value that is not equivalent to a corresponding data element may be defined as a data structure error. As described herein, one or more data structure errors comprising data indicative of an inconsistent data element may be identified, as shown at Block 512. For example, a verification server may determine that one or more of the data elements provided in the verification data structure have a value that is not equivalent to a corresponding data element of the data structure associated with the common data structure identifier stored by the verification system. The verification system may identify the inconsistent data element(s) as a data structure error and, in response, generate an error indicator associated with the data structure identifier and the one or more inconsistent data elements. As shown at Block 513, an updated supported data structure comprising at least a portion of the verification data structure including the one or more inconsistent data elements may be stored at the system repository. For example, in various embodiments, the updated supported data structure may comprise the generated error indicator associated with the one or more inconsistent data elements, so as to call out the identified error for a further review of the respective inconsistent data elements (e.g., by a human).

As shown at Block 514, the method may continue with appending an attention-required flag to the updated supported data structure associated with the data structure identifier. In various embodiments, the verification server may be configured append an attention-required flag to the updated supported data structure associated with the data structure identifier and defined at least in part by an inconsistent data element error. In various embodiments, the attention-required flag may function as an indication to any devices and/or users of the verification system that human interaction (e.g., a human-executed action) by a user associated with the verification system is required in order to execute one or more actions of a verification operation. In various embodiments, an attention-required flag being appended to the data structure associated with the data structure identifier may prevent the verification system from executing further operations relating to the ongoing verification workflow associated with the data structure identifier.

At Block 515, upon appending an attention-required flag to the updated supported data structure associated with the data structure identifier, the method 500 continues with generating a communication for presentation of at least a portion of the updated supported data structure associated with the data structure identifier at one or more networked system devices associated with the verification system. In various embodiments, the at least a portion of the updated supported data structure associated with the data structure identifier generated for inclusion within the communication may at least include the inconsistent data element indicator and each of data elements associated therewith to be manually assessed by the user associated with the networked system device. For example, in various embodiments, the generated communication may be configured to indicate to the user associated with the networked system device that an inconsistent data element error has been identified within the data structure associated with the data structure identifier, and, further, to present each of the inconsistent data elements from the system repository and the third-party system, respectively.

Figure 6:
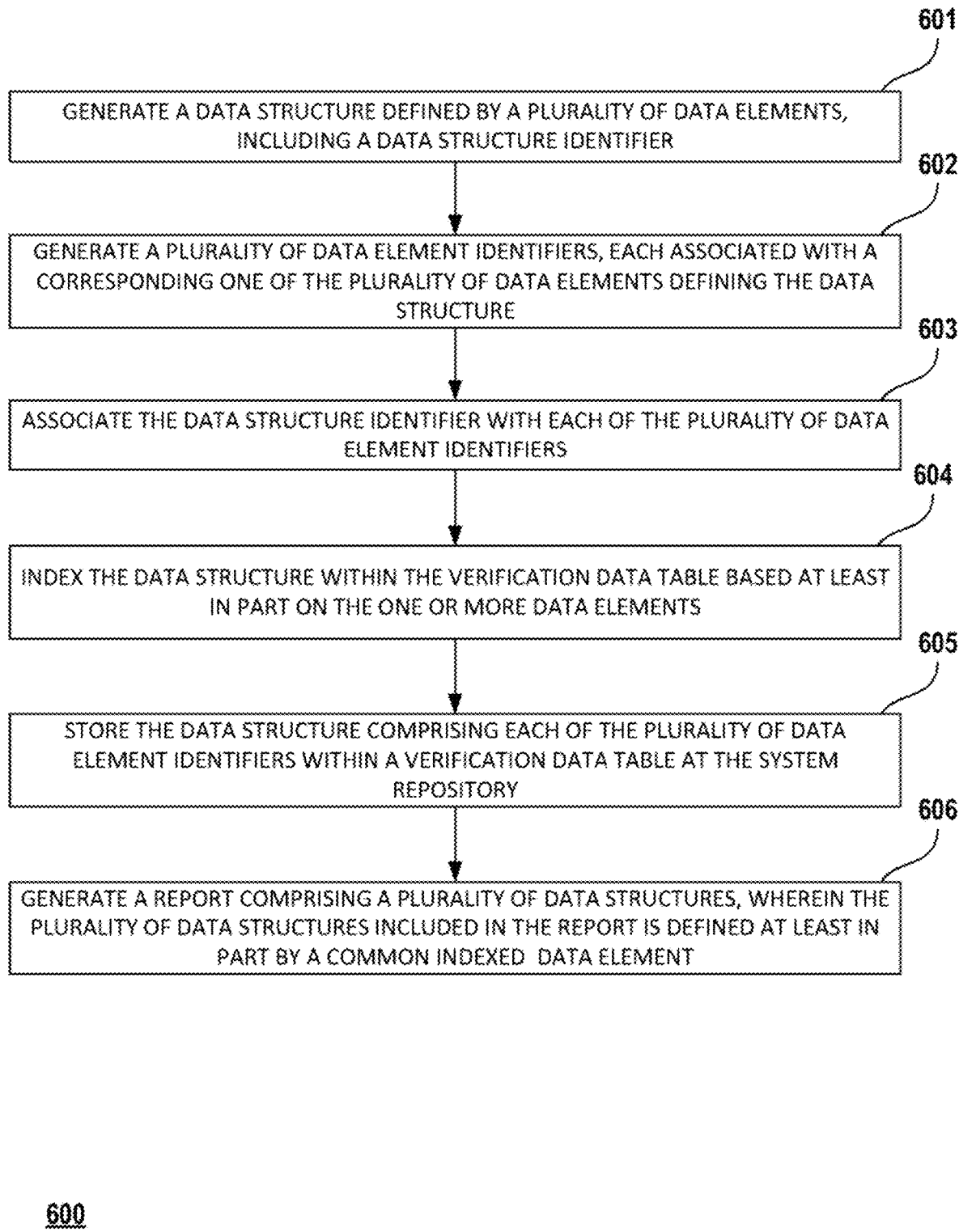
FIG. 6 illustrates a flowchart depicting operations performed in accordance with an example embodiment of the present disclosure.

FIG. 6 provides a flowchart illustrating various operations performed in accordance with an example embodiment of the present disclosure. In particular, FIG. 6 illustrates an exemplary method 600 of indexing data structures associated with a plurality of third-party servers within a verification system according to various embodiments described herein. As described herein, the verification server may be configured to index each of the data structures stored at a system repository based one or more data elements associated therewith so as to effectively characterize each of the data structures and enable consistent processes for the identification, organization, and/or analysis of the data structures stored within the verification system.

As shown at Block 601 of FIG. 6, a data structure defined by a plurality of data elements, including a data structure identifier, may be generated. As described herein, in various embodiments, a verification server may generate the data structure comprising a plurality of data elements that correspond to one or more data elements received from a third-party resource associated with a third-party system operated by a lender entity. For example, the one or more data elements that define the generated data structure may correspond at least in part to at least a portion of the data elements that define the lender data received by the verification system. As non-limiting examples, lender data associated with a third-party identifier associated with a lender entity may include data corresponding to a lender entity identifier, a loan identifier, a loan transaction timestamp, one or more borrower identifiers, one or more property identifiers, such as, for example, a street address identifier or a zip code identifier, a loan payment type identifier (e.g., an escrow loan identifier or a non-escrow loan identifier), and/or the like.

Further, in various embodiments, a data structure generated by a verification server may comprise a plurality of data elements that correspond to one or more data elements received from a third-party resource associated with a third-party system operated by a provider entity (e.g., via a verification data structure) during a verification workflow, as described herein. For example, a data structure generated by a verification server may correspond at least in part to at least a portion of the data elements that define the provider data received by the verification system. As non-limiting examples, provider data associated with a third-party identifier associated with a provider entity may include data corresponding to a provider entity identifier, a policy identifier, a policy start timestamp, a policy term identifier, one or more policy holder identifiers, one or more property identifiers, such as, for example, a street address identifier or a zip code identifier, a policy premium identifier, a policy deductible identifier, and/or the like. As described herein, the verification system may generate a data structure defined by a plurality of the aforementioned data elements, including a data structure identifier.

As shown at Block 602, a plurality of data element identifiers may be generated by the verification system, each of the data element identifiers corresponding to one of the plurality of data elements defining the data structure. In various embodiments, a data element identifier may comprise one or more items of data by which a data element and may be uniquely identified within a verification system, such as, for example, a textual indication of the data value and/or a textual indication of the data characteristic defined by the data element, such as, for example, "Property Owner Name," "Loan Number," "Policy Number," "Property Zip Code," "Loan Payment Type," and/or the like. In various embodiments, the data structure identifier associated with the data structure generated at Block 601 may be further associated with each of the data element identifiers associated with the data elements defining the data structure, as shown at Block 603.

As shown at Block 604, the data structure within the verification table may be indexed based at least in part on one or more of the data elements. In various embodiments, each of the data structures stored within a verification system may be indexed by a verification server based one or more data element identifiers associated therewith so as to effectively characterize each of the data structures and optimize data structure availability and accuracy throughout the verification system. In certain embodiments, various data associated with a data structure (e.g., metadata) and/or the contents of a data structure (e.g., one or more data elements or identifiers associated therewith) may be used to index the data structure and/or to facilitate various facets of searching (i.e., search queries that return results from the verification server). For example, one or more data element identifiers associated with data structure identifier may be identified and the data structure may be indexed in the verification server. In one embodiment, a data structure associated with a third-party identifier associated with a lender entity may be indexed such that the data structure is indexed separately (e.g., in a separate index associated with the lender entity that is not shared with other third-party systems operated by different lender entities and/or provider entities). As described herein, in various embodiments, the at least one of the one or more processing actions may be indexed in order to facilitate various facets of searching (i.e. search queries that return results from the system repository (e.g., from one or more verification tables)).

As shown at Block 605, the data structure comprising each of the plurality of data element identifiers may be stored within a verification table at a system repository associated with the verification system. In various embodiments, the data structure associated with the data structure identifier and comprising a plurality of data elements associated with respective data element identifiers as described above with respect to Block 602 may be transmitted to a system repository associated with the verification system for storage. For example, in various embodiments, the data structure associated with the data structure identifier may be stored at the system repository in a verification table. As described herein, a verification table may be utilized by a verification system, as described herein, to categorize and/or organize at least a portion of the data structures stored at the system repository based at least in part on one or more data characteristics, such as, for example, a common data element, identifier, indicator, and/or the like that defines and/or is associated with each of the data structures within the table. As a non-limiting example, a first verification table may include each of the data structures stored at the system repository that are associated with a particular third-party identifier. As a further non-limiting example, a second verification table may include each of the data structures stored at the system repository that have an attention-required flag appended thereto. As a further non-limiting example, a third verification table may include each of the data structures stored at the system repository that comprise a data element associated with a data element identifier that is a first state (e.g., California). As a further non-limiting example, in various embodiments, a verification table may comprise one or more lists defined by subsets and/or groups of data structures within an exemplary verification table. For example, within the aforementioned example verification comprising a plurality of data structures that include a data element associated with a data element identifier that is the first state, a first sub-table within the table may include each of the data structures stored within the verification table that comprise a data element associated with a data element identifier that identifies a non-escrow loan type.

As shown at Block 606, a system report comprising a plurality of data structures may be generated, wherein the plurality of data structures included in the report is defined at least in part by a common indexed data element. In various embodiments, a system report may comprise a collection of data associated with one or more data structure identifiers, a third-party identifier, and/or the like that is aggregated for the purpose of collective analysis and/or transmittal to one or more devices associated with one or both of the verification system and a third-party system operated by a lender entity. For example, a report may provide system statistics that numerically characterize at least a portion of the data structures stored at a system repository, such as, for example, a single data structure, each of the data structures stored with the system repository, and/or a subset of the data structures that each share a common indexed data element. In various embodiments, a system report may be renderable for display by a device, such as, for example, a third-party system device associated with a lender entity and/or a networked system device associated with a user identifier having have specific verification system employee credentials or adequate permissions to access and/or modify various data structures stored by the verification system.

As a non-limiting example, a system report may be generated by the verification server and associated with a third-party identifier, such as, a lender entity identifier. The verification server may generate the system report at least in part by parsing the indexed data structures stored at one or more verification tables so as to identify each of the data structures associated with the lender identifier. In such an exemplary circumstance, for example, the generated system report may include system statistics quantifying the number of data structures associated with the third-party identifier that comprise a verified data indicator, the number of data structures associated with the third-party identifier that have an attention-required flag appended thereto, the number of data structures associated with the third-party identifier that are further associated with a particular third-party identifier associated with a provider entity, and/or the like. As a further non-limiting example, a system report may be generated by the verification server and associated with a user identifier, such as, an identifier associated with a user profile that includes data identifying the user as having have specific verification system employee credentials to access and/or modify various data structures stored by the verification system. The verification server may generate the system report at least in part by parsing the indexed data structures stored at one or more verification tables so as to identify each of the data structures associated with the user identifier. In such an exemplary circumstance, for example, the generated system report may include system statistics quantifying the total number of data structures associated with the user identifier, the number of data structures associated with the user identifier that have an attention-required flag appended thereto, the number of data structures associated with the user identifier that are further associated with a particular third-party identifier associated with a provider entity, and/or the like, report timestamp data, and/or the like. In various embodiments, a generated system report may be stored by a verification server at one or more locations such that the report may be accessed in real-time and/or at a later instance by one or more devices associated with a user associated with a user profile that has specific verification system credentials or appropriate permissions to access the report.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for executing centralized data verification using supported data structures associated with one or more third-party system, the apparatus comprising one or more processors, and at least one non-transitory memory comprising instructions that, with the one or more processors, cause the apparatus to:
   receive, via an application programming interface (API) from a third-party resource associated with a third-party system, an unsupported verification data structure in an unsupported format defined by the third-party resource, wherein the unsupported verification data structure is associated with a data structure identifier, the data structure identifier being associated with a supported data structure stored at a verification system repository associated with a verification system;
   convert the unsupported verification data structure received from the third-party resource into a supported format in association with generating a supported verification data structure using one or more validation rules to compare the unsupported verification data structure with at least a portion of the supported data structure stored in the verification system repository and associated with the data structure identifier;
   based at least in part on a determination that the unsupported verification data structure associated with the data structure identifier matches at least a corresponding portion of the supported data structure associated with the data structure identifier, generate a verified data structure indicator associated with the data structure identifier; and
   store the supported verification data structure associated with the data structure identifier at the verification system repository as an updated supported data structure comprising the verified data structure indicator comprising the verified data structure indicator.

2. The apparatus of claim 1, wherein the one or more processors are further configured to retrieve the supported data structure associated with the data structure identifier from the verification system repository upon detecting a trigger event associated with the data structure identifier via a networked system device associated with the verification system.

3. The apparatus of claim 1, wherein the one or more processors are further configured to determine that the unsupported verification data structure associated with the data structure identifier comprises one or more data structure errors.

4. The apparatus of claim 3, wherein the one or more data structure errors comprise data indicative of a missing data structure; and wherein the one or more processors are further configured to:
   based at least in part on a determination that the unsupported verification data structure associated with the data structure identifier comprises the one or more data structure errors comprising data indicative of indicative of the missing data structure, provide a data structure inquiry request data packet to an additional third-party system resource associated with an additional third-party system to request a second verification data structure associated with the data structure identifier from the additional third-party system resource.

5. The apparatus of claim 3, wherein the one or more data structure errors comprise data indicative of an inconsistent data element; and wherein the one or more processors are further configured to:
   based at least in part on a determination that the unsupported verification data structure associated with the data structure identifier comprises the one or more data structure errors comprising data indicative of an inconsistent data element, append an attention-required flag to the supported data structure associated with the data structure identifier.

6. The apparatus of claim 5, wherein the one or more processors are further configured to, upon appending the attention-required flag to the supported data structure associated with the data structure identifier, automatically generate an electronic communication comprising at least a portion of the supported data structure associated with the data structure identifier to a networked system device associated with the verification system, the electronic communication being configured to present for display the portion of the supported data structure and the attention-required flag appended to the supported data structure associated with the data structure identifier.

7. The apparatus of claim 5, wherein the one or more processors are configured to identify the inconsistent data element based at least in part on a comparison of a verification element defining at least a portion of the unsupported verification data structure with a corresponding data element of the supported data structure stored in the verification system repository and associated with the data structure identifier.

8. The apparatus of claim 1, wherein the one or more processors are further configured to:
provide a plurality of data structure inquiry request data packets to a plurality of third-party resources, each associated with a respective third-party system identifier; and
convert a plurality of unsupported verification data structures received from each of the plurality of third-party resources into the supported format as supported verification data structures.

9. The apparatus of claim 1, wherein the supported data structure comprises a plurality of data structure elements, wherein the one or more processors are further configured to:
generate a plurality of data element identifiers, each associated with a corresponding one of the plurality of data structure elements defining the supported data structure; and
associate the data structure identifier with each of the plurality of data element identifiers, such that the supported data structure comprises each of the plurality of data element identifiers.

10. The apparatus of claim 9, wherein the one or more processors are further configured to:
store the supported data structure comprising each of the plurality of data element identifiers within a verification table at the verification system repository; and
index the supported data structure within the verification table based at least in part on the one or more of the plurality of data structure elements.

11. The apparatus of claim 10, wherein the one or more processors are further configured to generate a report comprising a plurality of supported data structures, wherein each of the plurality of supported data structures included in the report is defined at least in part by a common indexed data element.

12. A method of executing centralized data verification using supported data structures associated with one or more third-party system, the method comprising:
receiving, via an application programming interface (API) from a third-party resource associated with a third-party system, an unsupported verification data structure in an unsupported format defined by the third-party resource, wherein the unsupported verification data structure is associated with a data structure identifier, the data structure identifier being associated with a supported data structure stored at a verification system repository associated with a verification system;
converting the unsupported verification data structure received from the third-party resource into a supported format in association with generating a supported verification data structure using one or more validation rules to compare the unsupported verification data structure with at least a portion of the supported data structure stored in the verification system repository and associated with the data structure identifier;
based at least in part on a determination that the unsupported verification data structure associated with the data structure identifier matches at least a corresponding portion of the supported data structure associated with the data structure identifier, generating a verified data structure indicator associated with the data structure identifier; and storing the supported verification data structure associated with the data structure identifier at the verification system repository as an updated supported data structure comprising the verified data structure indicator comprising the verified data structure indicator.

13. The method of claim 12, further comprising retrieving the supported data structure associated with the data structure identifier from the verification system repository upon detecting a trigger event associated with the data structure identifier via a networked system device associated with the verification system.

14. The method of claim 12, further comprising determining that the unsupported verification data structure associated with the data structure identifier comprises one or more data structure errors.

15. The method of claim 14, wherein the one or more data structure errors comprise data indicative of a missing data structure; and wherein the method further comprises:
based at least in part on a determination that the unsupported verification data structure associated with the data structure identifier comprises the one or more data structure errors comprising data indicative of indicative of the missing data structure, providing a data structure inquiry request data packet to an additional third-party system resource associated with an additional third-party system to request a second verification data structure associated with the data structure identifier from the additional third-party system resource.

16. The method of claim 14, wherein the one or more data structure errors comprise data indicative of an inconsistent data element; and wherein the method further comprises:
based at least in part on a determination that the unsupported verification data structure associated with the data structure identifier comprises the one or more data structure errors comprising data indicative of an inconsistent data element, appending an attention-required flag to the supported data structure associated with the data structure identifier.

17. The method of claim 12, further comprising:
providing a plurality of data structure inquiry request data packets to a plurality of third-party resources, each associated with a respective third-party system identifier; and
converting a plurality of unsupported verification data structures received from each of the plurality of third-party resources into the supported format as supported verification data structures.

18. The method of claim 12, wherein the supported data structure comprises a plurality of data structure elements, wherein the method further comprises:
generating a plurality of data element identifiers, each associated with a corresponding one of the plurality of data structure elements defining the supported data structure; and
associating the data structure identifier with each of the plurality of data element identifiers, such that the supported data structure comprises each of the plurality of data element identifiers.

19. The method of claim 18, wherein the method further comprises:
storing the supported data structure comprising each of the plurality of data element identifiers within a verification table at the verification system repository; and
indexing the supported data structure within the verification table based at least in part on the one or more of the plurality of data structure elements.

20. A computer program product for executing centralized data verification using supported data structures associated with one or more third-party system, the computer program product comprising a non-transitory computer-readable storage medium storing computer program code that, when executed by an apparatus, causes the apparatus to:

receive, via an application programming interface (API) from a third-party resource associated with a third-party system, an unsupported verification data structure in an unsupported format defined by the third-party resource, wherein the unsupported verification data structure is associated with a data structure identifier, the data structure identifier being associated with a supported data structure stored at a verification system repository associated with a verification system;

convert the unsupported verification data structure received from the third-party resource into a supported format in association with generating a supported verification data structure using one or more validation rules to compare the unsupported verification data structure with at least a portion of the supported data structure stored in the verification system repository and associated with the data structure identifier;

based at least in part on a determination that the unsupported verification data structure associated with the data structure identifier matches at least a corresponding portion of the supported data structure associated with the data structure identifier, generate a verified data structure indicator associated with the data structure identifier; and store the supported verification data structure associated with the data structure identifier at the verification system repository as an updated supported data structure comprising the verified data structure indicator comprising the verified data structure indicator.

* * * * *